(12) United States Patent
Baron et al.

(10) Patent No.: US 12,021,769 B2
(45) Date of Patent: Jun. 25, 2024

(54) VARIABLE CONFIGURATIONS OF NFRP RU TONE SETS IN WIRELESS NETWORKS

(71) Applicant: CANON KABUSHIKI KAISHA, Tokyo (JP)

(72) Inventors: Stéphane Baron, Le Rheu (FR); Patrice Nezou, Liffre (FR); Pascal Viger, Janze (FR)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 17/623,850

(22) PCT Filed: Jun. 29, 2020

(86) PCT No.: PCT/EP2020/068255
§ 371 (c)(1),
(2) Date: Dec. 29, 2021

(87) PCT Pub. No.: WO2021/001316
PCT Pub. Date: Jan. 7, 2021

(65) Prior Publication Data
US 2022/0360376 A1 Nov. 10, 2022

(30) Foreign Application Priority Data
Jul. 4, 2019 (GB) .................................... 1909634

(51) Int. Cl.
*H04L 5/00* (2006.01)
*H04L 1/1867* (2023.01)
(Continued)

(52) U.S. Cl.
CPC .......... *H04L 5/0044* (2013.01); *H04L 1/1896* (2013.01); *H04L 5/0048* (2013.01);
(Continued)

(58) Field of Classification Search
CPC ... H04L 5/0044; H04L 1/1896; H04L 5/0048; H04L 5/0094; H04L 27/2602; H04W 72/20; H04W 74/006; H04W 74/0816
(Continued)

(56) References Cited

U.S. PATENT DOCUMENTS 11,197,275 B2* 12/2021 Nezou ............... H04W 74/0833
2019/0089424 A1* 3/2019 Cariou .............. H04W 72/0446
(Continued)

FOREIGN PATENT DOCUMENTS

| CN | 104429148 A | 3/2015 |
| CN | 109819519 A | 5/2019 |

(Continued)

OTHER PUBLICATIONS

Laurent Cariou, et al., Explanations for CR on 27.5.2.7 NDP Feedback Report, IEEE 802.11-17/0074RO, XP055537753, Jan. 2017, pp. 4-8, 10.

(Continued)

*Primary Examiner* — John J Tabone, Jr.
(74) *Attorney, Agent, or Firm* — Canon U.S.A., Inc. IP Division

(57) ABSTRACT

A flexible NFRP procedure is proposed where the AP can adjust the granularity of the possible answers to a given question. The NFRP trigger frame includes a tone set configuration indication representative of a number of tone groups per RU tone set. The number of possible FEEDBACK_STATUS values consequently also varies, making it possible for the AP to poll the stations for more detailed feedback reports. A station determines which FEEDBACK_STATUS values are available, calculates its FEEDBACK_STATUS value and retrieves the corresponding subset of tone groups on which energy must be sent. Due to the multiples existing tone set configurations, the station also (Continued)

determines the tones forming the subset to be activated, based on the tone set configuration indication. The station can then properly send its feedback report response by activating (emitting energy on) the appropriate tunes and therefore the appropriate tone groups.

22 Claims, 8 Drawing Sheets

(51) Int. Cl.
- *H04L 27/26* (2006.01)
- *H04W 72/20* (2023.01)
- *H04W 74/00* (2009.01)
- *H04W 74/0816* (2024.01)

(52) U.S. Cl.
CPC ........ *H04L 5/0094* (2013.01); *H04L 27/2602* (2013.01); *H04W 72/20* (2023.01); *H04W 74/006* (2013.01); *H04W 74/0816* (2013.01)

(58) Field of Classification Search
USPC .................. 714/712, 748–750; 370/328–331; 455/434
See application file for complete search history.

(56) References Cited

U.S. PATENT DOCUMENTS

| | | | |
|---|---|---|---|
| 2019/0159207 A1* | 5/2019 | Chen | H04L 5/0053 |
| 2019/0349232 A1* | 11/2019 | Cariou | H04B 7/0417 |
| 2021/0044389 A1* | 2/2021 | Kim | H04L 5/0055 |
| 2021/0045095 A1* | 2/2021 | Cariou | H04W 76/15 |
| 2021/0076165 A1* | 3/2021 | Li | H04L 1/1642 |
| 2021/0195478 A1* | 6/2021 | Cariou | H04L 5/0053 |
| 2021/0250133 A1* | 8/2021 | Chun | H04L 1/00 |
| 2021/0274484 A1* | 9/2021 | Park | H04W 72/0453 |
| 2021/0368497 A1* | 11/2021 | Nezou | H04L 5/0094 |
| 2021/0409165 A1* | 12/2021 | Wang | H04L 1/1822 |
| 2022/0360376 A1* | 11/2022 | Baron | H04L 1/1896 |

FOREIGN PATENT DOCUMENTS

| | | |
|---|---|---|
| WO | 2018/140187 A1 | 8/2018 |
| WO | 2018/144074 A1 | 8/2018 |
| WO | 2018/156211 A1 | 8/2018 |

OTHER PUBLICATIONS

Laurent Cariou, et al., Explanations for CR on 27.5.2.7 NDP feedback report, Mar. 6, 2017, Doc. No. IEEE 802.11-17/0074r3.

* cited by examiner

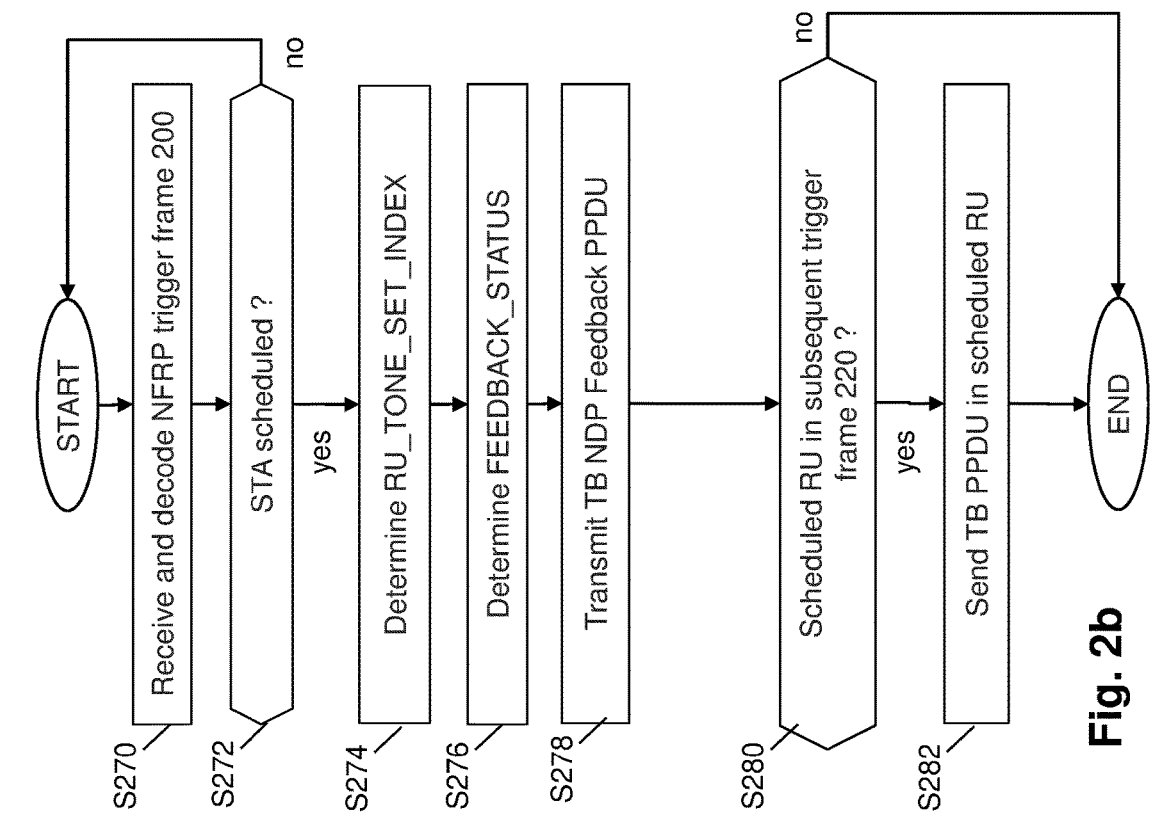
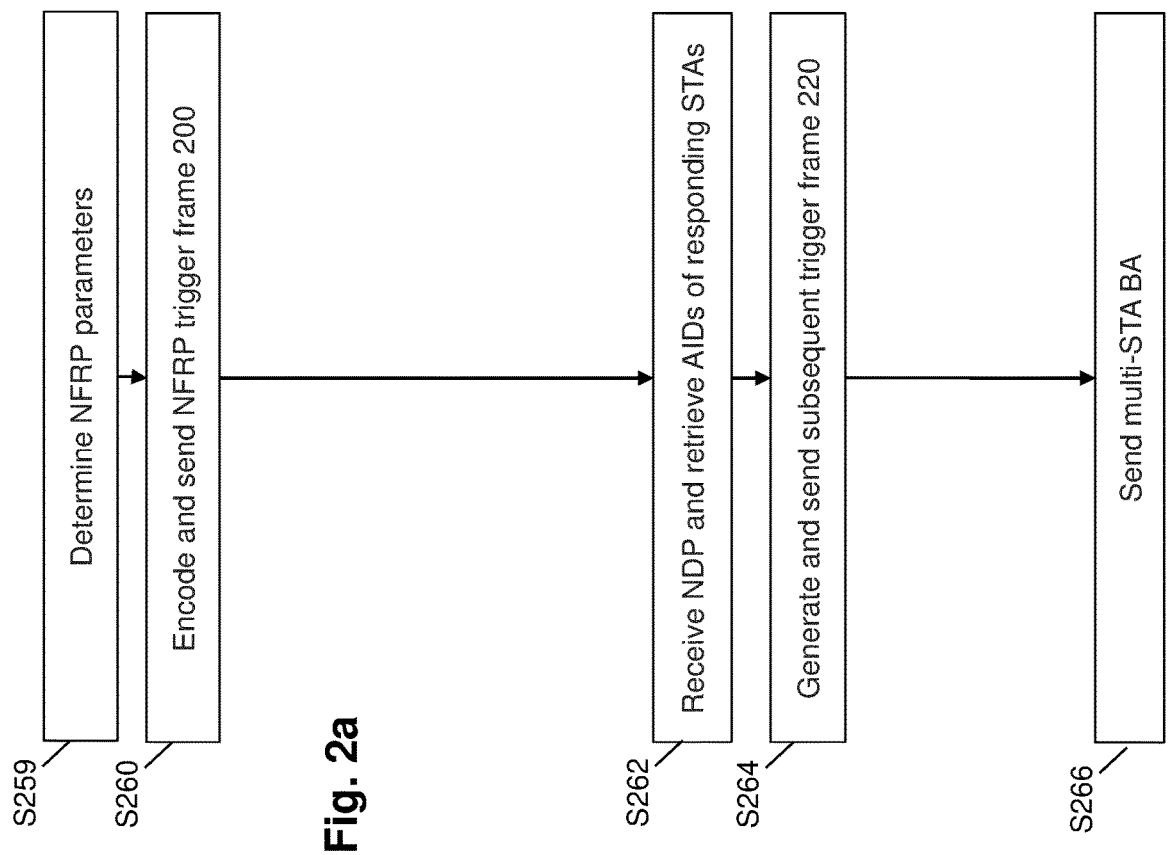
Fig. 2a
Fig. 2b

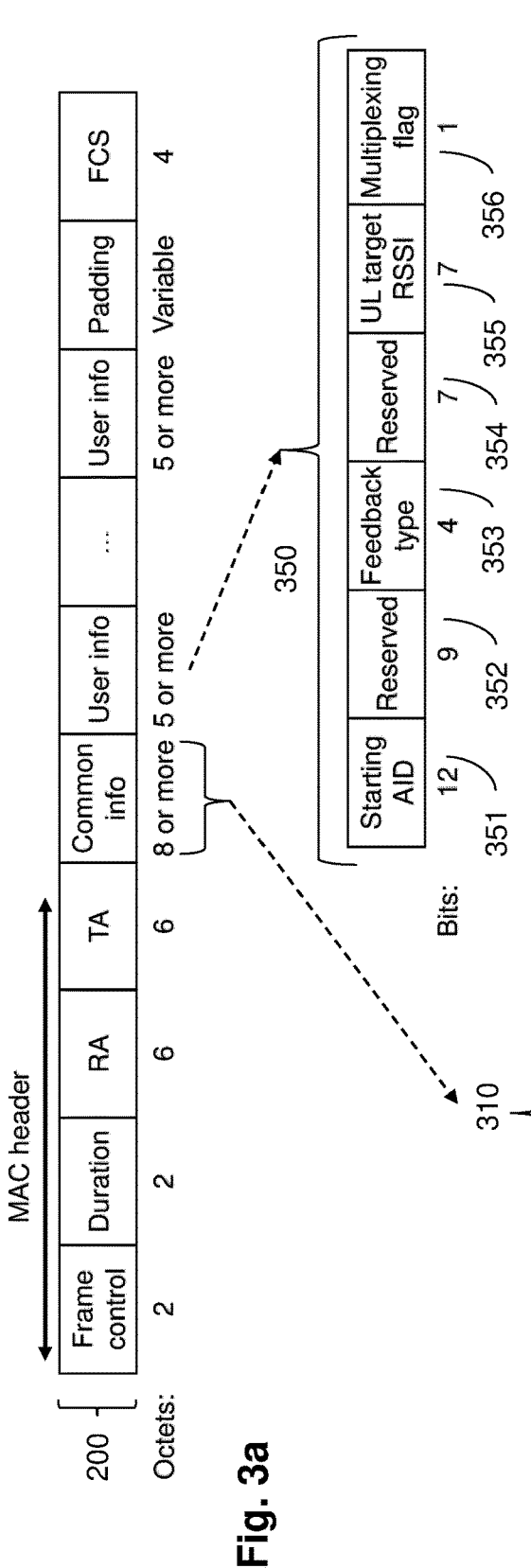
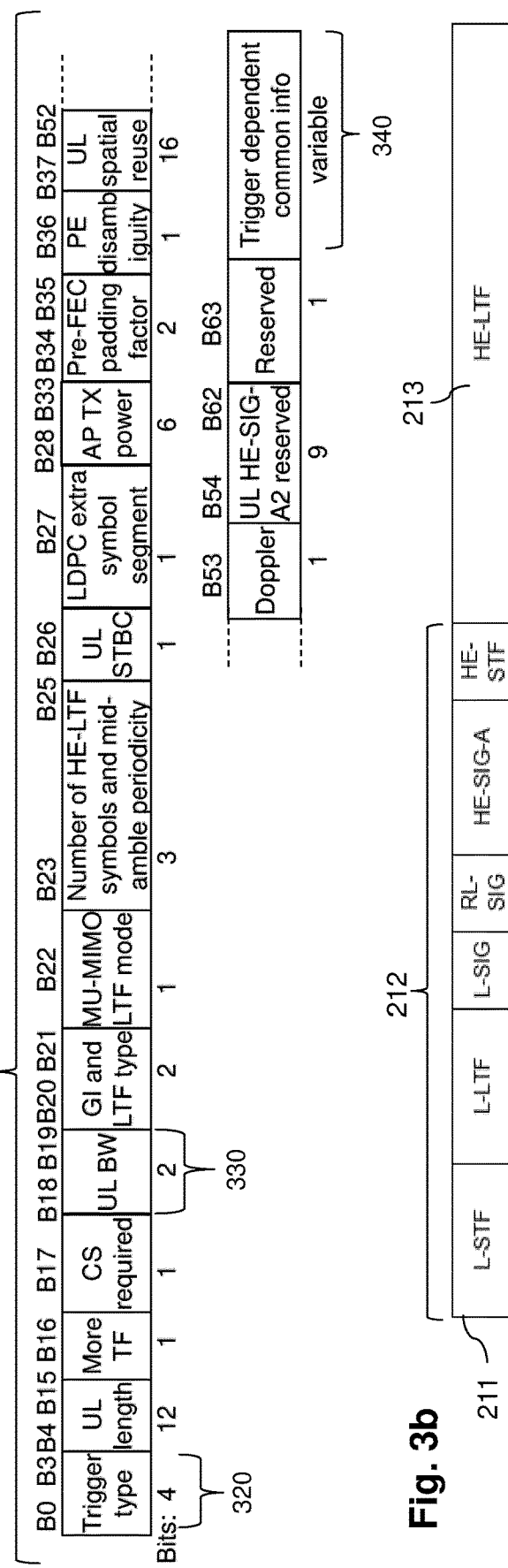
Fig. 3a
Fig. 3b

VARIABLE CONFIGURATIONS OF NFRP RU TONE SETS IN WIRELESS NETWORKS

CROSS REFERENCE TO RELATED APPLICATION

This is a National Stage Application filed under 35 U.S.C. 371 of International Application No. PCT/EP2020/068255 filed on Jun. 29, 2020, which claims the benefit under 35 U.S.C. § 119(a)-(d) of United Kingdom Patent Application No. 1909634.6, filed on Jul. 4, 2019 and entitled "VARIABLE CONFIGURATIONS OF NFRP RU TONE SETS IN WIRELESS NETWORKS". The above-cited patent applications are incorporated herein by reference in their entireties.

FIELD OF THE INVENTION

The present invention relates generally to communication networks and more specifically to wireless communication methods in a wireless network and corresponding communication devices, such as an access point (AP) and non-AP stations.

BACKGROUND OF THE INVENTION

The IEEE 802.11 (RTM) family of standards provides multi-user (MU) schemes to allow a single access point (AP) to schedule MU transmissions, i.e. multiple simultaneous transmissions to or from non-AP stations or "nodes", in the wireless network. This approach increases bandwidth and decreases latency requirements compared to original 802.11 networks.

MU downlink (DL) transmission is allowed where the AP performs multiple simultaneous elementary transmissions, over so-called resource units (RUs), to various non-AP stations. As an example, the resource units split a communication channel of the wireless network in the frequency domain, based for instance on Orthogonal Frequency Division Multiple Access (OFDMA) technique.

MU uplink (UL) transmissions are also allowed that are triggered by the AP. Various non-AP stations can simultaneously transmit to the AP over the resource units forming the MU UL transmission. To control the MU UL transmission by the non-AP stations, the AP sends a control frame, known as a Trigger Frame (TF), which defines a plurality of resource units for the non-AP stations.

Various variants of trigger frames exist depending on the nature of information the non-AP stations can provide in response. The main variant is the basic trigger frame for the non-AP stations to send any data they wish.

Some RUs may be allocated in a basic trigger frame to specific non-AP stations using 16-bit Association IDentifiers (AIDs) assigned to them upon registration to the AP (so-called scheduled RUs). Others RUs (known as random RUs) are available to the non-AP stations using a contention-based access scheme.

A variant trigger frame to the basic trigger frame is the Null-Data-Packet (NDP) Feedback Report Poll (NFRP) trigger frame implementing the so-called Null-Data-Packet (NDP) Feedback Report procedure. This procedure allows the AP to collect feedback that is not channel sounding from multiple non-AP stations in a more efficient manner than with a basic trigger frame. The AP sends a NFRP Trigger frame to solicit NDP feedback report responses about buffered bytes from many non-AP stations that are identified by a range of scheduled AIDs in the NFRP Trigger frame. Each non-AP stations is assigned a RU tone set made of two groups of tones. The NDP feedback report response from a non-AP station is a HE trigger-based (TB) feedback NDP transmitted on either tone group depending on the value of the response. The NDP feedback report response can take two possible response values: 0 (for transmission of the HE TB NDP over the first group of tones) if the buffered bytes are lower than a predefined threshold and 1 (for transmission of the HE TB NDP over the second group of tones) if the buffered bytes are above the predefined threshold.

The NFRP procedure is short compared to the duration of an UL transmission triggered by a basic Trigger frame. The AP thus has a first knowledge of the stations' needs at low time cost.

However, the AP usually needs more precise and detailed information on these stations' needs to efficiently schedule them in MU UL operations. This more precise and detailed information may be obtained through Buffer Status Reports (BSRs) sent by the stations in a solicited or unsolicited manner. To solicit such reports by polling the stations, the AP uses another variant of trigger frames, the so-called Buffer Status Report Poll (BSRP) trigger frame which provides scheduled and/or random RUs for BSR transmission.

The need of unsolicited or solicited BSRs, and thus of an additional BSRP procedure, shows that the NFRP procedure is not fully satisfactory.

SUMMARY OF INVENTION

The present invention seeks to overcome some of the foregoing concerns.

In this context, the invention provides a communication method in a wireless network, comprising the following steps at a (non-AP) station:

receiving, from an access point, AP, a null data packet, NDP, feedback report poll, NFRP, trigger frame, the NFRP trigger frame reserving a plurality of resource unit, RU, tone sets for NDP feedback report responses by stations, retrieving, from the NFRP trigger frame, a tone set configuration indication representative of a number of one or more groups of tones forming each of the RU tone sets, wherein one or more subsets of the groups of tones in an activated state correspond to one or more possible response values for the NDP feedback report responses, respectively, determining a response value for a NDP feedback report response by the station to the NFRP trigger frame based on the tone set configuration indication, and sending the NDP feedback report response by activating the tone groups of the subset corresponding to the determined response value, in a selected responding RU tone set.

Only the tone group or groups of the subset are activated by the sending of energy to make it possible for the AP to discriminate between the various possible NDP feedback report responses.

Correspondingly, the invention provides a communication method in a wireless network, comprising the following steps at an access point:

sending, to (non-AP) stations, a null data packet, NDP, feedback report poll, NFRP, trigger frame, the NFRP trigger frame reserving a plurality of resource unit, RU, tone sets for NDP feedback report responses by stations, wherein the NFRP trigger frame includes a tone set configuration indication representative of a number of one or more groups of tones forming each of the RU tone sets, wherein one or more subsets of the groups of tones in an activated state correspond to one or more possible response values for the NDP feedback report responses, respectively, receiving at least one NDP feedback report response through activation by at least one responding station of the tone groups of one of the subsets in a responding RU tone set, and determining a response value for the NDP feedback report response based on the subset corresponding to the activated tone groups in the responding RU tone set.

Thanks to the tone set configuration indication, the AP can dynamically adapt the number of tone groups per responding TU tone set and thereby adapt the number of possible response values for the stations. Consequently, the AP can adapt the response granularity of the polling.

Advantageously, the AP can then obtain more detailed buffer information from the stations without involving a subsequent Buffer Status Report polling (BSRP).

Correlatively, the invention also provides a communication device, either the AP or a non-AP station, comprising at least one microprocessor configured for carrying out the steps of any of the above methods.

Optional features of embodiments of the invention are defined in the appended claims. Some of these features are explained here below with reference to a method, while they can be transposed into device features.

In one embodiment, each tone group subset of a RU tone set is made of a single group of tones from the groups of tones forming the RU tone sets. In that case, the number of possible response values for the NDP feedback report responses is equal to the number of tone groups per RU tone set. This embodiment advantageously allows collisions to be easily detected at RU tone set level, for instance when the AP receives NDP feedback report responses on a plurality of subsets within the same RU tone set.

In a variant, at least one tone group subset of a RU tone set is made of two or more groups of tones from the groups of tones forming the RU tone sets. In other words, all combinations of groups of tones may be contemplated to form a higher number of subsets, hence a higher number of possible response values. In that case, the number of possible response values for the NDP feedback report responses may be related to $2^n$ where n is the number of tone groups per RU tone set. This variant thus advantageously offers a higher number of possible response values.

In some embodiments, determining the response value for a NDP feedback report response includes determining a response value from a set of possible response values the number of which depends on the tone set configuration indication. Indeed, by adjusting the tone set configuration indication, the AP controls the granularity of the responses from the non-AP stations.

In some embodiments, tone groups (preferably each one) of the groups of tones forming the responding RU tone set are associated with respective traffic access categories, ACs, from a group of traffic ACs, and determining a response value for the NDP feedback report response comprises:

for each traffic AC, selecting or not the tone group associated with the traffic AC based on an AC-based criterion, e.g. whether the amount of buffered bytes for this AC is above a predefined threshold or not, and selecting the response value corresponding to the subset formed of the selected tone groups. A correspondence table may match the various results of the AC-based criteria to the various subsets (i.e. configurations of tone groups to be activated to send the response). This approach efficiently improves the conventional NFRP polling by allowing the non-AP stations to give details on each AC. Consequently, the AP can adapt subsequent exchanges with the non-AP stations, for instance to give priority to non-AP stations having buffered data in high priority ACs.

In some embodiments, the possible response values for the NDP feedback report response are associated with respective ranges for a station measurement (e.g. amount of buffered data), each range being defined by a different multiplying factor applied to the same threshold value. For instance, first range is made from 0 to THR (e.g. response value is 0), second range from THR to 2×THR (e.g. response value is 1), . . . , last range above N×THR (e.g. response value is N). The station thus selects the response value corresponding to the range to which its measurement belongs. This approach makes it possible for the AP to dynamically adjust the granularity of the obtained detailed information on a specific measurement from the stations, without a need to send range definitions for all the ranges.

In one embodiment, the tone set configuration indication is included in a Reserved field of a User Info field of the NFRP trigger frame according to Draft 4.1 of IEEE 802.11ax. This approach keeps retro-compatibility because it keeps unchanged the other fields currently used.

In a variant, the tone set configuration indication is included in a Trigger Dependent Common Info field of a Common Info field of the NFRP trigger frame according to Draft 4.1 of IEEE 802.11ax.

In yet another variant, the tone set configuration indication is defined by a feedback type field in the NFRP trigger frame. This approach keeps compliance with the current format of the NFRP trigger frame as various values for the 802.11ax Feedback Type field are available for new usages. For instance, feedback type field=1 may upgrade the conventional feedback type field=0 (polling of resource request according to the amount of buffered bytes) by defining more (e.g. 3) tone groups per RU tone set, and thus allowing the non-AP stations to be more precise on their resource needs (a higher number of buffered byte thresholds is used).

In some embodiments, the tone set configuration indication is a 2-bit field in the NFRP trigger frame and the number of one or more groups of tones forming each of the RU tone sets is equal to the tone set configuration indication plus 1. This provides a good tradeoff between signaling cost and details in the NDP feedback report response. Of course, 3-bit filed, 4-bit field or larger fields may be used, depending on the needs (in particular the number of possible response values).

In one embodiment, each RU tone set (throughout a set of tone set configurations available) has a fixed number of tones and the tone set configuration indication adjusts the number of tones per group. In that case, the tone set configuration indication may merely indicate the number of tones per group, thereby defining the number of groups per RU tone set. Consequently, the number of RU tone sets is fixed per 20 MHz channel (without considering the MIMO spatiality) and their constituting tones are split into the appropriate number of tone groups. Advantageously, this embodiment does not impact the number of stations the AP can poll per each 20 MHz channel.

In a variant, each group of tones has a fixed number of tones and the tone set configuration indication adjusts the number of RU tone sets. In that case, the tone set configuration indication may merely indicate the number of RU tone sets per 20 MHz channel, thereby defining the number of groups per RU tone set. Consequently, the number of RU tone sets varies per 20 MHz channel. Advantageously, the AP sensitivity for detection of the NDP feedback report responses remains unchanged.

In both cases, the tone set configuration indication may merely indicate the number of groups per RU tone set.

Of course, more complicated schemes may be envisioned where both number of tones per group and number of RU tone sets (per 20 MHz channel) are adjusted by the tone set configuration indication.

In some embodiments, the method further comprises, at the station, determining whether the station is polled (i.e. targeted) by the NFRP trigger frame based on the retrieved tone set configuration indication. Indeed, as the number $N_{STA}$ of RU tone sets may vary depending on the tone set configuration indication, the number of targeted non-AP stations also varies. The non-AP station may for instance determine whether its AID is included in range [StartingAID, StartingAID+$N_{STA}$] where StartingAID is an AID specified in the NFRP trigger frame.

In some embodiments, the method further comprises, at the station, determining tones forming the subset of tone groups to be activated, based on the retrieved tone set configuration indication. The determined tones are activated by transmission of null data packets NDP (energy) to the AP. Indeed, as various tone set configurations are available, the non-AP station needs to retrieve the appropriate configuration and then activate the appropriate tones for transmission of the NDP feedback report response. The correspondences between constituting tones and tone set configurations may be stored in a table local to each station.

In some embodiments, the method further comprises, at the AP, determining a number of stations having newly registered to the AP, and determining the tone set configuration indication based on the determined number of newly registered stations.

For instance, the AP may provide a tone set configuration indication representative of a high number of groups of tones when a low number of newly registered stations is determined, or provide a tone set configuration indication representative of a low number of groups of tones when a high number of newly registered stations is determined.

The AP thus dynamically adapts the number of tone groups per RU tone set depending on the activity, to either obtain more detailed information from few non-AP stations or obtain coarser information from a high number of non-AP stations.

In some embodiments, the method further comprises, at the AP:

receiving NDP feedback report responses from responding stations and determining corresponding response values, selecting a subset of the responding stations based on the corresponding response values so determined, and sending, to the stations, a subsequent trigger frame reserving a plurality of resource units scheduled for stations of the selected subset. For instance, if the feedback responses from the stations are representative of an amount of stored data for various ACs, the AP may provide MU UL operation for those responding stations that have AC_VO data. This AP behavior helps to improve network QoS.

In some embodiments, the method may further comprise, at the AP, sending, to the stations, a second NFRP trigger frame reserving a plurality of second RU tone sets for NDP feedback report responses by stations, wherein the second NFRP trigger frame includes a tone set configuration indication representative of a number of one or more groups of tones forming each of the second RU tone sets that is different from the number of tone groups forming each of the RU tone set of the other NFRP trigger frame.

Correspondingly, the method may further comprise, at the station, receiving, from the AP, a second NFRP trigger frame reserving a plurality of second RU tone sets for NDP feedback report responses by stations, wherein the second NFRP trigger frame includes a tone set configuration indication representative of a number of one or more groups of tones forming each of the second RU tone sets that is different from the number of tone groups forming each of the RU tone set of the other NFRP trigger frame.

This feature mirrors the dynamic adaptation by the AP of the number of tone groups per RU tone set.

Another aspect of the invention relates to a non-transitory computer-readable medium storing a program which, when executed by a microprocessor or computer system in a communication device, causes the communication device to perform any method as defined above.

The non-transitory computer-readable medium may have features and advantages that are analogous to those set out above and below in relation to the communication methods and devices.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIGS. 2a and 2b illustrate, using flowcharts, corresponding general steps at the access point and at a non-AP station, respectively;

FIG. 3a illustrates the format of a trigger frame, in particular of NFRP type;

FIG. 3b illustrates the format of TB NDP PPDU;

DETAILED DESCRIPTION

The invention will now be described by means of specific non-limiting exemplary embodiments and by reference to the figures.

In the description, the term legacy refers to non-802.11ax stations, meaning 802.11 stations of previous technologies that do not support OFDMA communications.

Figure 1:
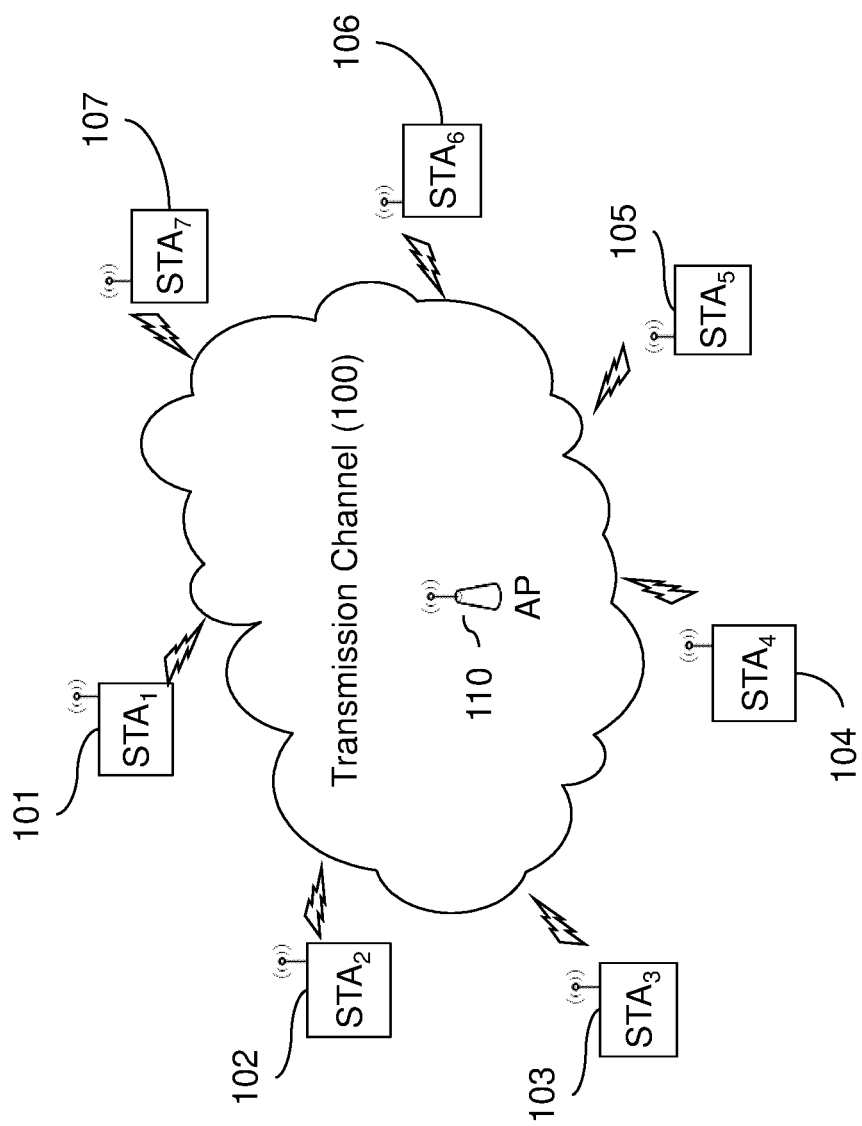
FIG. 1 illustrates a communication system in which embodiments of the invention may be implemented.

FIG. 1 illustrates a communication system in which several communication stations (or "nodes") 101-107 exchange data frames over a radio transmission channel 100 of a wireless local area network (WLAN), under the management of a central station, or access point (AP) 110, also seen as a station of the network. The radio transmission channel 100 is defined by an operating frequency band constituted by a single channel or a plurality of channels forming a composite channel.

In the following, the word "station" refers to any kind of station. The wording "access point station", or in short "access point" (AP), refers to the station playing the role of access point 110. The wording "non-access point station", or in short "non-AP station", or client station (STA) refers to the other stations 101-107. In the following, the terms HE STA and HE AP refer respectively to an 802.11ax non-AP STA and an 802.11ax AP.

Access to the shared radio medium to send data frames is primarily based on the CSMA/CA technique, for sensing the carrier and avoiding collision by separating concurrent transmissions in space and time.

Carrier sensing in CSMA/CA is performed by both physical and virtual mechanisms. Virtual carrier sensing is achieved by transmitting control frames to reserve the medium prior to transmission of data frames.

Next, a source or transmitting station, including the AP, first attempts through the physical mechanism, to sense a medium that has been idle for at least one DIFS (standing for DCF InterFrame Spacing) time period, before transmitting data frames.

However, if it is sensed that the shared radio medium is busy during the DIFS period, the source station continues to wait until the radio medium becomes idle.

The wireless communication system of FIG. 1 comprises physical access point 110 configured to manage the WLAN BSS (Basic Service Set), i.e. a group of non-AP stations which have previously registered to the AP. A physical access point 110 may be configured to manage two or more WLANs (or BSSs), i.e. two or more groups of station. Each BSS is uniquely identified by a specific basic service set identifier, BSSID, and managed by a virtual AP implemented in the physical AP.

To access the medium, any station, including the AP, starts counting down a backoff counter designed to expire after a number of timeslots when the medium is sensed as idle. The backoff counter is chosen randomly in a so-called contention window [0, CW], where CW is an integer. This backoff mechanism or procedure, also referred to as Distributed Coordination Function (DCF) contention-based channel access scheme, is the basis of the collision avoidance mechanism that defers the transmission time for a random interval, thus reducing the probability of collisions on the shared channel. After the backoff time expires (i.e. the backoff counter reaches zero), the source station may send data or control frames if the medium is still idle.

Conventional single-user (SU) transmission can occur on at least a primary 20 MHz channel (used for contention) and some secondary 20 Mhz channels: The resulting bandwidth of an operating channel may be e.g. 20 MHz, 40 MHz, 80 MHz, 80+80 MHz, or 160+160 MHz, or 320 MHz. The channels may include one or more subcarriers or tones, for instance a 20 MHz channel is made of 242 tones.

Management of quality of service (QoS) has been introduced at station level in the wireless networks, through well-known EDCA mechanism defined in the IEEE 802.11e standard. EDCA (Enhanced Distributed Channel Access) mechanism defines four traffic access categories (ACs) or «priorities» to manage access to the medium: a voice access category (AC_VO), a video access category (AC_VI), a best effort access category (AC_BE) for standard applications and a background access category (AC_BK) when traffic is low.

Developments in the 802.11ax standard seek to enhance efficiency and usage of the wireless channel for dense environments.

In this perspective, multi-user (MU) transmission features have been considered that allow multiple simultaneous transmissions to/from different non-AP stations in both downlink (DL) and uplink (UL) directions from/to the access point. In the uplink, multi-user transmissions can be used to mitigate the collision probability by allowing multiple non-AP stations to simultaneously transmit to the AP.

To actually perform such multi-user transmission, it has been proposed to split a legacy 20 MHz channel into at least one subchannel, but preferably a plurality of sub-channels (elementary sub-channels), also referred to as sub-carriers or resource units (RUs) or "traffic channels", that are shared in the frequency domain by multiple users, based for instance on Orthogonal Frequency Division Multiple Access (OFDMA) technique. In some embodiments, the bandwidth of the RUs may be based on a number of active data subcarriers. In some embodiments, the bandwidth of the RUs is based on 26, 52, 106, 242 (a whole 20 MHz channel), 484 (40MHz channel), 996 (80 MHz channel), or 2×996 (80+80 Mhz or 160 Mhz channel) active data subcarriers or "tones".

While the MU DL transmission is fully managed by the AP, the MU UL transmission requires the AP sends a control frame to the non-AP station to trigger the simultaneous MU UL transmissions from the non-AP stations. Such control frame is known as a Trigger Frame (TF), various variants of which exist depending on the usage of the MU UL sub-carriers desired by the AP.

Figure 2:
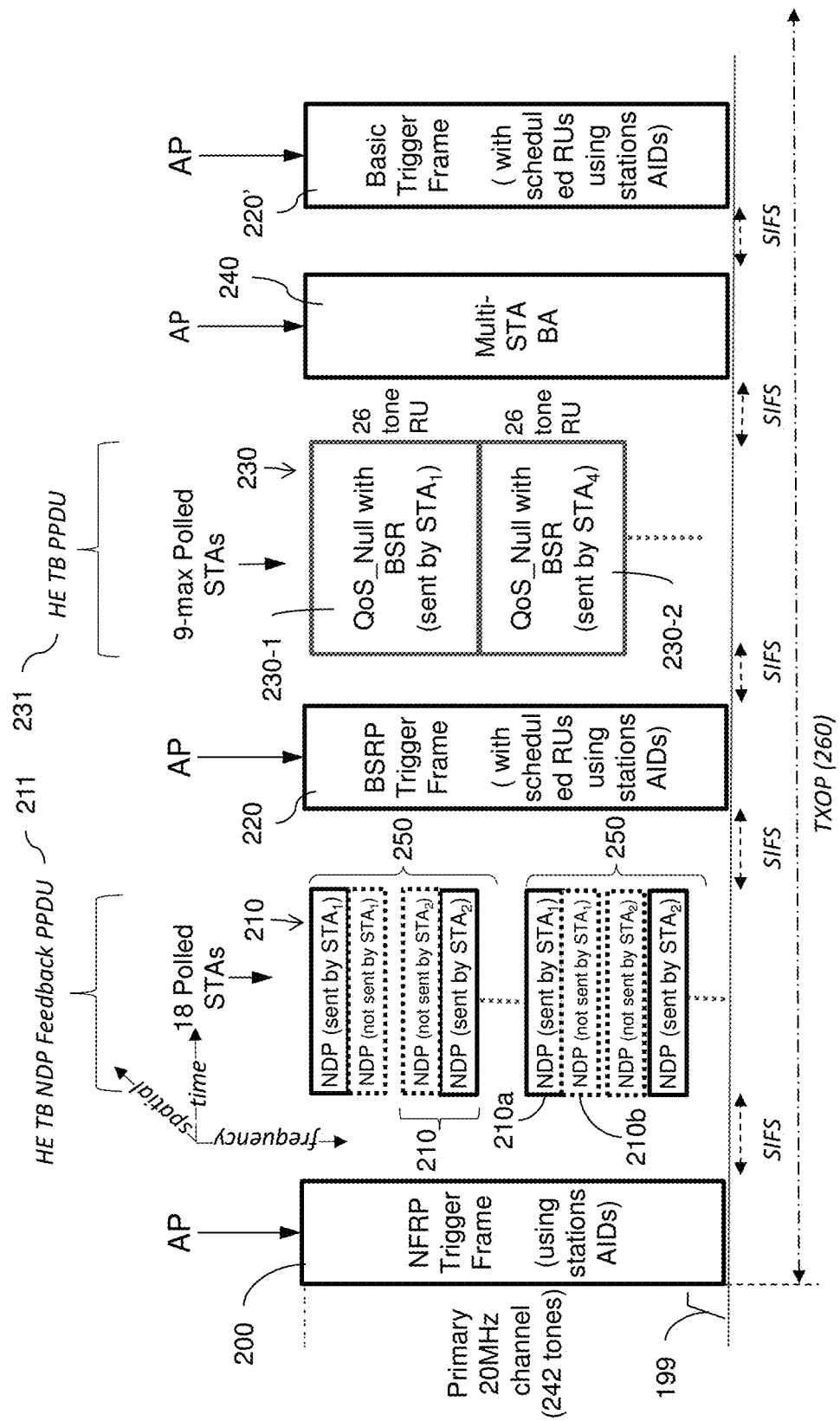
FIG. 2 illustrates three usages of trigger frames.

FIG. 2 illustrates two usages of trigger frames. In the exemplary embodiment shown, a short feedback report procedure according to 802.11ax (as described in section "26.5.7 NDP feedback report procedure" of Draft D4.1 of IEEE 802.11 ax) is shown followed by a Buffer Status Report operation (as described in section "26.5.5 Buffer status report operation" of Draft D4.1 of IEEE802.11ax) based on the results of the short feedback report procedure. A subsequent MU UL operation is then initiated by the AP.

The NDP feedback report procedure allows the AP 110 to collect feedback that is not channel sounding from multiple non-AP STAs 101-107. The AP sends an NFRP Trigger frame to solicit NDP feedback report response from many non-AP STAs that are identified by a range of scheduled AIDs in the NFRP Trigger frame. A non-AP STA uses the information carried in the NFRP Trigger frame to know if it is scheduled, and in this case, may send a NDP feedback report response, usually a HE TB feedback NDP.

Next, based on the received NDP feedback report responses, the AP may solicit any responding non-AP STA, for instance solicit simultaneous immediate response frames from one or more of the responding non-AP STAs using a basic Trigger Frame (for UL MU operation) or a BSRP Trigger Frame as shown in the example.

The example shown considers a single 20 MHz channel. Of course, the bandwidth of the channel and the number of RUs splitting a 20 MHz channel may be different from what is depicted. FIGS. 2a and 2b illustrate, using flowcharts, corresponding general steps at the AP and a non-AP STA, respectively.

The AP is willing to poll non-AP stations using a feedback short procedure. At preliminary step S259, the AP determines NFRP parameters values for NFRP trigger frame 200 to be sent. NFRP trigger frame 200 is a specific trigger frame. It identifies the polled non-AP STAs by a range of scheduled AIDs.

With reference to FIG. 3a, like each and every 802.11ax trigger frame, NFRP trigger frame 200 comprises:
a frame header with a standardized "Frame Control" field, a standardized "Duration" field, an "RA" field set to a broadcast MAC address, and a "TA" field set to a MAC address of the AP transmitting the trigger frame,
a "Common Info" field 310,
one or more "User Info" fields 350, and
padding and FCS fields.

The "Common Info" field 310 comprises a "Trigger Type" subfield 320 which specifies the type of the trigger frame. For instance, NFRP trigger frame 200 is signaled by a value 7 in the "Trigger Type" subfield 320. It also comprises a 2-bit "UL BW" field 330 specifying the bandwidth of the channel considered, e.g. BW=0 to define a 20 MHz bandwidth, BW=1 for a 40 MHz bandwidth, BW=2 for an 80 MHz bandwidth, BW=3 for an 80+80 MHz or 160 MHz bandwidth (see Table 9-31c of the D4.1 version of 802.11ax). It ends by a Trigger Dependent Common Info subfield 340 of variable length whose content depends on the "Trigger Type" subfield 320. The other fields shown are of less importance for the present invention.

Specific to the trigger frame of NFRP type, a single "User Info" field 350 is provided that comprises a 12-bit Starting AID field 351, a first reserved 9-bit portion 352, a 4-bit feedback type field 353, a second reserved 7-bit portion 354, a 7-bit UL Target RSSI field 355 and a 1-bit multiplexing flag field 356.

The Starting AID comprises the starting AID of the range of AIDs targeted by the NFRP trigger frame 200, i.e. scheduled to respond to the poll. The range size or width $N_{STA}$ is defined by the "UL BW" field 330 together the 1-bit multiplexing flag field 356, using the following formula $N_{STA}=18\times 2^{BW}\times(\text{MultiplexingFlag}+1)$ For instance, when the MultiplexingFlag is set to 0 (no MIMO), 18 non-AP STAs are requested to answer with a feedback response, per 20 MHz operating channel. When the MultiplexingFlag is set to 1, 36 non-AP STAs are scheduled per 20 MHz operating channel. It may be noted that some AIDs in the 18 or 36-wide range may not be currently assigned to a non-AP STA.

The multiplexing flag field 356 defines whether spatiality (MIMO) is provided: the flag indicates the number (minus 1) of non-AP STAs that are multiplexed on the same set of tones in the same RU.

The "feedback type" field 353 indicates a type of feedback that is being polled by the AP. For the time being, 802.11ax D4.1 only defines a feedback type equal to 0 that is a resource request. The corresponding polling thus seeks to know whether the responding non-AP STAs 101-107 are requesting UL resources to transmit PPDUs to the AP 110.

At step S259, the AP thus determines the values for StartingAID field 351, Feedback Type field 353, Multiplexing Flag field 356 and UL BW field 330.

At phase 199, the AP 110 accesses the wireless medium. For example, the AP performs a contention-based method (which may include a clear channel assessment and an EDCA backoff) to acquire access to the wireless medium.

Upon accessing the medium, the AP 110 polls non-AP STAs to know their needs for transmission. To do so, it sends NFRP trigger frame 200 at step S260.

In the example of FIG. 2, the NFRP trigger frame 200 is sent in a 20 MHz primary channel. However, as already discussed, the NFRP trigger frame 200 may also be sent through an extended channel such as 40 MHz, 80 MHz or larger bands to extend the number of polled stations. By sending trigger frame 200, the AP reserves a transmission opportunity 260 (TXOP) corresponding to the duration specified inside the NFRP trigger frame.

If the NFRP trigger frame is sent over an overall width larger than the primary 20 MHz channel, the 802.11ax standard envisages that the NFRP trigger frame is duplicated (replicated) on each other 20 MHz channels forming the targeted composite channel. Thanks to the duplication of control-type frames in non-HT format, it is expected that every nearby legacy node (non-HT or 802.11ac nodes) receiving the NFRP trigger frame (or a duplicate thereof) on its primary channel, then sets its NAV to the value specified in the NFRP trigger frame. This prevents these legacy nodes from accessing the channels of the targeted composite channel during the TXOP.

Each non-AP STA receiving frame 200 is able to first analyze the received frame 200 to determine whether the non-AP STA is concerned with it, in particular to determine whether the non-AP STA is associated with the BSSID indicated in the TA field of the frame (or if the indicated BSSID pertains to a multiple BSSID set for which the non-AP STA is member of).

In case of positive determination, it then determines whether received frame 200 is a NFRP trigger frame, thanks to the type specified in Trigger Type field 320. These determinations form step S270 (FIG. 2b).

Next, the non-AP STA determines whether it is scheduled or "polled" by the received NFRP trigger frame (step S272). It is made by checking whether its AID value (assigned to the non-AP STA by the AP upon registration to the AP) falls within the range ["Starting AID"; "Starting AID"+$N_{STA}$] as obtained from the fields UL BW 330, Starting AID 351 and Multiplexing flag 356 of the received NFRP trigger frame 200.

When the non-AP STA is not scheduled, nothing more happens at the non-AP station.

If it is polled by the NFRP trigger frame, the scheduled non-AP STA determines a RU tone set index, i.e. a RU tone set 210 on which the non-AP STA will transmit energy in response to the NFRP trigger frame. This is step S274. The non-AP STA usually selects a responding RU tone set based on the position of its AID within the above range, meaning the first RU tone set for the non-AP station having the Starting AID as own AID, and so on.

Table 27-30 of 802.11ax D4.1 describes an example of how the tones forming 80 MHz, 40 MHz, 20 MHz channels are grouped into sets of tones.

For instance, 216 tones (indexed from −113 to −6 and 6 to 113) forming a 20 MHz channel are split into six bundles 250 of 36 continuous tones. Next each RU tone set is formed by two tones from each bundle (usually consecutive tones that are collocated from one bundle to the other), thereby resulting in 18 RU tone sets, each having a unique index RU_TONE_SET_INDEX. The two tones obtained from each bundle are assigned to two respective groups forming the RU tone set. It means that each RU tone set is formed of two groups of tones 210a and 210b.

For illustrative purposes, the tone set with RU_TONE_SET_INDEX=6 in a 20 MHz channel without spatiality is made of the two following groups of tones (subcarrier indices):

Group 210a: −103, −67, −31, 16, 52, 88
Group 210b: −102, −66, −30, 17, 53, 89

In this example, 6 tones are replicated in each group over the 20 MHz channel, each tone from one of the six bundles of tones 250.

A RU tone set is thus made of two adjacent groups of tones (−103 is adjacent to −102, −67 to −66 and so on.), each group being made of non-adjacent tones (−103 not adjacent to −67 and so on.).

Basically, the tone set index for the scheduled non-AP STA is computed from the difference between STA's AID value and "Starting AID" value (usually the difference plus 1). For instance, if this difference plus 1 equals 6, the above-detailed tone set having RU_TONE_SET_INDEX=6 is scheduled for the non-AP STA considered.

Next at step S276, the non-AP STA generates the NDP feedback report response to be sent to the AP.

In particular, the non-AP STA has to transmit energy on the first group 210a of subcarriers or tones to indicate a first response to the feedback type (field 353) polled by the NFRP trigger frame 200, and on the other hand, the non-AP STA must transmit energy on the second group 210b of subcarriers or tones to indicate a second response to the feedback type. The encoding of the response is thus performed by activating (i.e. sending energy) the corresponding group of tones.

The response is named FEEDBACK_STATUS in the current D4.1 version of 802.11ax. For instance, for the Feedback Type field 353 set to 0 (Resource request), FEEDBACK_STATUS is set to 0 when the non-AP STA requests resource with buffered bytes for transmission between 1 and a resource request buffer threshold. The non-AP station will thus use (i.e. activate) the first group 210a of tones;

FEEDBACK_STATUS is set to 1 when the non-AP STA requests resource with buffered bytes for transmission above the resource request buffer threshold. The non-AP station will thus use (i.e. activate) the second group 210b of tones.

The non-AP station determines the NDP feedback report response to be sent depending on the feedback type field in the NFRP trigger frame.

Table 27-30 of 802.11 ax D4.1 specifies which group of tones within a tone set has to be used depending on the FEEDBACK_STATUS value. At step S276, the non-AP STA thus determines the FEEDBACK_STATUS value and therefore the group of tones to be used, either 210a or 210b, depending on the feedback it wishes to report to the AP.

Next at step S278, the non-AP STA transmits energy on the group corresponding to the FEEDBACK_STATUS value in the RU tone set of the determined RU_TONE_SET_INDEX.

For illustration, Station 1 (corresponding to RU_TONE_SET_INDEX=1) transmits energy on its first group of tones 210a (as consequence, group 210b is represented with a dash line), thereby activating the latter. On the contrary, Station 2 (corresponding to RU_TONE_SET_INDEX=1) transmits energy on its second group of tones 210b, thereby activating the tones of this second group.

Technically, the HE TB NDP Feedback PPDU 211 used as a feedback response is a single packet with no real data payload as shown in FIG. 3b. The PHY preamble 212 is emitted on 20 MHz width (thus several non-AP STAs may emit the same preamble) and the 'payload' is composed of a series of HE-LTF symbols 213, located on the tones forming the selected group 210a or 210b, to be used for the transmitted feedback (energy).

Then, the physical layer of the AP receives and decodes (S262) the RU tone sets where energy is present, to provide its MAC layer with a list of used RU_TONE_SET_INDEX and the corresponding Feedback responses (FEEDBACK_STATUS values).

Thanks to the fields UL BW 330, Starting AID 351 and Multiplexing flag 356 of the NFRP trigger frame 200 sent at step S260, the AP is able to retrieve the AID of each responding RU tone set with energy, and thereby retrieve the AID of each non-AP STA responding to the trigger frame 200. The MAC layer entity of the AP is consequently able to determine those NDP-scheduled non-AP STAs who have responded.

At step S264, the AP can send a subsequent trigger frame 220 (FIG. 2) to offer new opportunities (RUs) to the responding non-AP STAs, for example a 'Basic' type trigger frame to let the non-AP stations send any type of data or a 'BSRP' type trigger frame (as shown in the example) to receive BSRs from the non-AP stations or any convenient type. The 'Basic' type trigger frame is signaled by a "Trigger Type" subfield 320 having value 0 while the 'BSR' type trigger frame is signaled by a "Trigger Type" subfield 320 having value 4.

Based on an AP's decision and the collected feedback responses 211, the trigger frame 220 may define a plurality of data resource units (RUs) 230 (here of 26 tones—of course other numbers of tones may be used). The multi-user feature of OFDMA allows the AP to assign different RUs to different non-AP STAs in order to increase competition. This helps to reduce contention and collisions inside 802.11 networks.

These RUs may be scheduled RUs assigned to the feedback-responding non-AP STAs, using the AIDs retrieved at step S264.

The trigger frame 220 may for instance include a plurality of User Info fields (FIG. 3a) for a respective plurality of scheduled RUs, each User Info field setting an AID (so-called AID12 field) of the scheduled non-AP STA for a given RU in the channel.

The non-AP STAs thus receive the subsequent trigger frame 220 and determine whether they are scheduled (step S280).

In the affirmative, the non-AP STA can use the RU scheduled to it (i.e. the one with the AID corresponding to the non-AP STA) and transmit data (HE TB PPDU) to the AP, in the example a QOS_Null frame with BSR as the trigger frame 220 is of BSRP type.

According to the exemplary illustration, Station 1 and Station 4 can thus be granted a RU 230. As an example, Station 1 emits a QoS_Null with Buffer Status Report 231 (the HE TB PPDU is a MAC-PDU with no data payload but with a MAC header containing a BSR) in a first RU 230-1, and Station 4 emits a QoS_Null with Buffer Status Report 231 in a second RU 230-2.

Upon receiving the HE TB PPDU 231, the AP acknowledges (or not) the data on each RU by sending a multi-STA block acknowledgment (BA) response (240—FIG. 2), making it possible for each sending non-AP STA to know when its data transmission is successful (reception of the ACK) or not (no ACK after expiry of a time-out). This is step S266.

It is then possible for the AP to provides other opportunities (RUs) for the non-AP stations whose BSR indicates some buffered data are to be sent. A Basic Trigger Frame 220' may for instance be sent by the AP to provide subsequent UL MU operation with RUs scheduled for these stations.

These explanations show the intent of the NFRP trigger frame mechanism according to the current version of the 802.11ax standard: to receive feedbacks in a short time from a high number of associated non-AP stations.

The overall MU Uplink (UL) medium access sequence, including both NDP Feedback RUs and BSRP or UL MU scheduled RUs, seems more efficient than conventional EDCA access scheme, especially in dense environments as envisaged by the 802.11ax standard. This is because the number of collisions generated by simultaneous medium access attempts and the overhead due to the medium access are both reduced. The NFRP trigger frame 200 allows information to be requested from 18 non-AP stations per 20 MHz channel (more with spatial multiplexing), and the NFRP or Basic trigger frame 220/220' allows RUs to be proposed to up to 9 stations which have shown their interest to be triggered (by responding to the NFRP trigger frame).

In this exemplary scenario, the non-AP stations first signal their interest to be triggered using the short feedback procedure, then the AP polls the responding non-AP stations to know details on their needs or the AP hopes to receive unsolicited BSRs from the non-AP stations, otherwise the AP could only trigger a very basic UL MU operation that is badly tuned to stations' needs. This is because the short feedback procedure only allows the non-AP stations to provide a binary response representative of whether it has more or less buffered bytes than a threshold.

Only when all the detailed needs are known by the AP through the BSRP procedure, the latter can trigger an efficient UL MU operation targeting the non-AP stations with specific needs.

However, the addition of the Null-Data-Packet (NDP) Feedback Report procedure and the BSRP procedure is bandwidth and time consuming.

The inventors have thus contemplated providing a more flexible NFRP feedback report procedure, allowing the AP to adjust the granularity of the possible answers to a given question, while keeping the NFRP advantages such as a large number of non-AP stations polled and low latency.

In this perspective, the proposed invention provides a NFRP trigger frame that includes a tone set configuration indication representative of a number of one or more groups of tones forming each of the RU tone sets, and one or more subsets of the groups of tones in an activated state (i.e. if energy is sent on them) correspond to one or more possible response values for the NDP feedback report responses, respectively. By adjusting the number of tone groups per RU tone set, the AP adjusts the number of possible NDP responses and hence the details the non-AP stations can transmit to the AP regarding a given feedback type (i.e. a question).

A non-AP station having a NFRP response value to be sent thus determines the subset of tone groups corresponding to the NFRP response value given the tone set configuration corresponding to the tone set configuration indication. This ensures the non-AP station to send its NDP feedback report response by activating the appropriate tone group subset (for appropriate understanding by the AP), i.e. the one corresponding to the determined response value given the tone set configuration indication. The group or groups of tones to be activated to send the response can thus change for a given response value, because the tone set configuration changes depending on the indication provided by the AP.

Consequently, the AP can decide when it wishes to receive more detailed information, e.g. a precise amount of buffered bytes, to efficiently schedule a subsequent UL MU operation, or when it wishes to receive coarser information to poll a higher number of non-AP stations.

Figure 4:
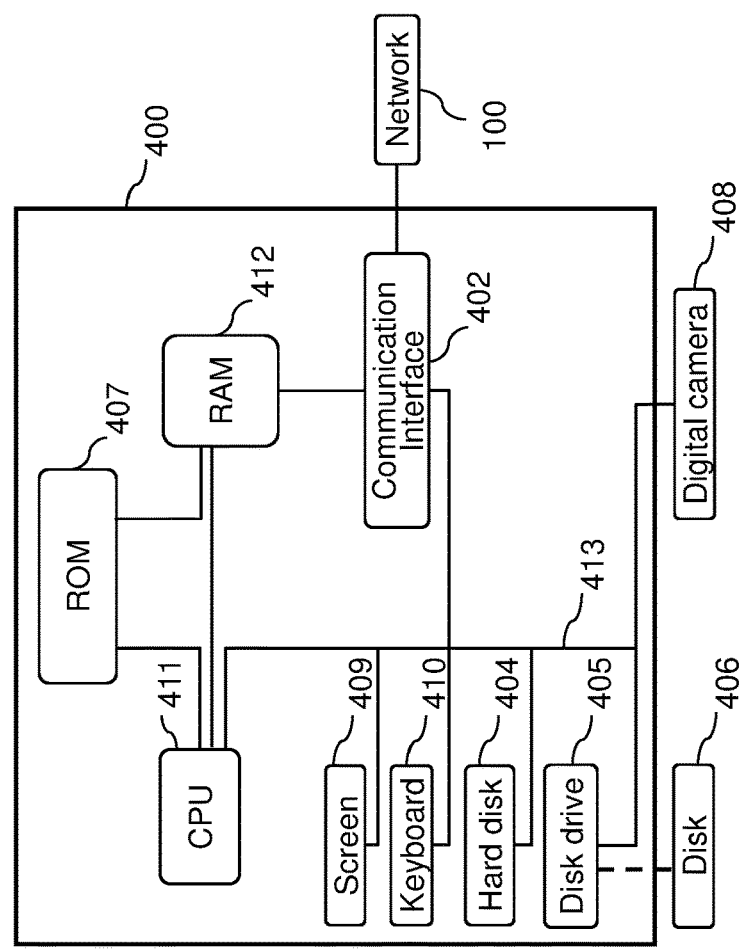
FIG. 4 shows a schematic representation a communication device in accordance with embodiments of the present invention.

FIG. 4 schematically illustrates a communication device 400 of the radio network 100, either the AP 110 or any non-AP STA 101-107, configured to implement at least one embodiment of the present invention. The communication device 400 may preferably be a device such as a microcomputer, a workstation or a light portable device. The communication device 400 comprises a communication bus 413 to which there are preferably connected:

- a central processing unit 411, such as a microprocessor, denoted CPU;
- a read only memory 407, denoted ROM, for storing computer programs for implementing the invention;
- a random-access memory 412, denoted RAM, for storing the executable code of methods according to embodiments of the invention as well as the registers adapted to record variables and parameters necessary for implementing methods according to embodiments of the invention; and
- at least one communication interface 402 connected to the radio communication network 100 over which digital data packets or frames or control frames are transmitted, for example a wireless communication network according to the 802.11ax/be protocols. The frames are written from a FIFO sending memory in RAM 412 to the network interface for transmission or are read from the network interface for reception and writing into a FIFO receiving memory in RAM 412 under the control of a software application running in the CPU 411.

Optionally, the communication device 400 may also include the following components:

- a data storage means 404 such as a hard disk, for storing computer programs for implementing methods according to one or more embodiments of the invention;
- a disk drive 405 for a disk 406, the disk drive being adapted to read data from the disk 406 or to write data onto said disk;
- a screen 409 for displaying decoded data and/or serving as a graphical interface with the user, by means of a keyboard 410 or any other pointing means.

The communication device 400 may be optionally connected to various peripherals, such as for example a digital camera 408, each being connected to an input/output card (not shown) so as to supply data to the communication device 400.

Preferably the communication bus provides communication and interoperability between the various elements included in the communication device 400 or connected to it. The representation of the bus is not limitative and in particular the central processing unit is operable to communicate instructions to any element of the communication device 400 directly or by means of another element of the communication device 400.

The disk 406 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to embodiments of the invention to be implemented.

The executable code may optionally be stored either in read only memory 407, on the hard disk 404 or on a removable digital medium such as for example a disk 406 as described previously. According to an optional variant, the executable code of the programs can be received by means of the communication network 403, via the interface 402, in order to be stored in one of the storage means of the communication device 400, such as the hard disk 404, before being executed.

The central processing unit 411 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 404 or in the read only memory 407, are transferred into the random access memory 412, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

Figure 5:
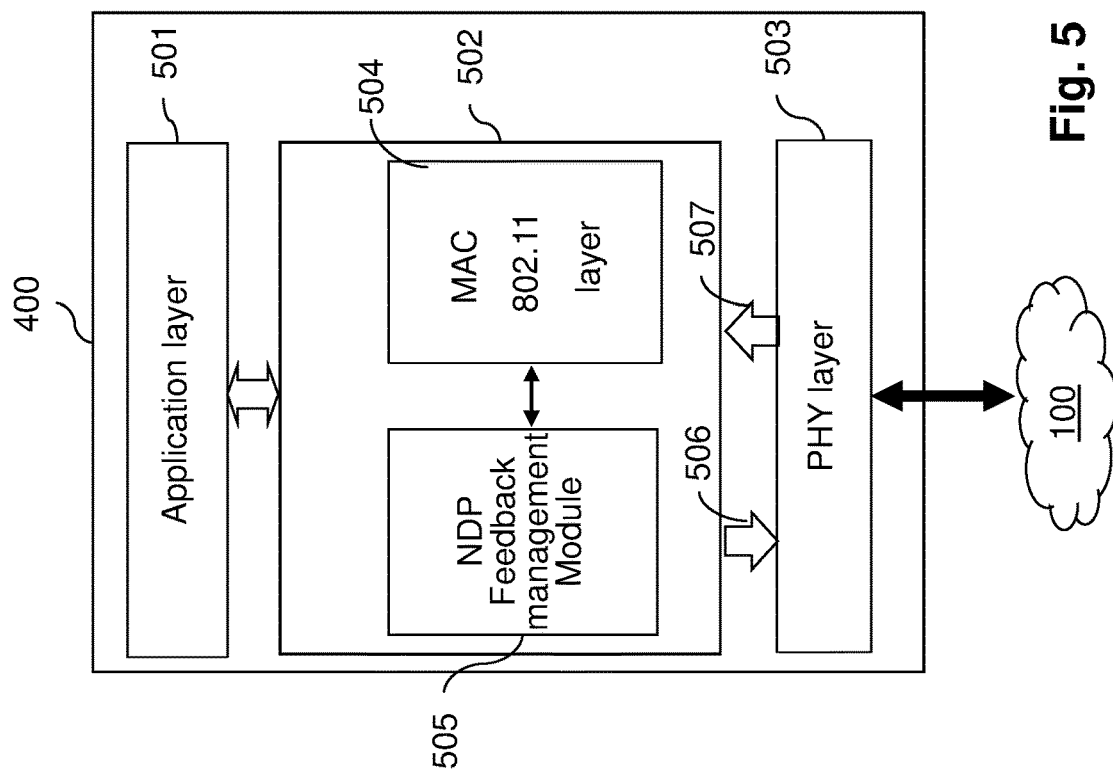
FIG. 5 schematically illustrates functional blocks of a communication device in accordance with embodiments of the present invention.

FIG. 5 is a block diagram schematically illustrating the architecture of the communication device 400 adapted to carry out, at least partially, the invention. As illustrated, communication device 400 comprises a physical (PHY) layer block 503, a MAC layer block 502, and an application layer block 501.

The PHY layer block 503 (e.g. a 802.11 standardized PHY layer) has the task of formatting, modulating on or demodulating from any 20 MHz channel or the composite channel, and thus sending or receiving frames over the radio medium used 100, such as 802.11 frames, for instance single-user frames, such as control frames (e.g. ACK, Trigger Frame), MAC data and management frames, based on a 20 MHz width to interact with legacy 802.11 stations or with 802.11ax/be in legacy mode (such as for Trigger Frames), as well as MAC data frames of OFDMA type having preferably smaller width than 20 MHz legacy (typically 2 or 5 MHz), as well as NDP frames having preferably a PHY header transmitted on 20 MHz width and a short payload consisting on energy located on non-contiguous subcarriers or tones, to/from that radio medium.

The MAC layer block or controller 502 preferably comprises a MAC 802.11 layer 504 implementing conventional 802.11ax/be MAC operations, and an additional block 505 for carrying out, at least partially, embodiments of the invention. The MAC layer block 502 may optionally be implemented in software, which software is loaded into RAM 412 and executed by CPU 411.

Preferably, the additional block 505 referred to as NDP Feedback Management module 505 is configured to implement steps according to embodiments that are performed by the communication device 400, notably transmitting operations for a transmitting/responding station and receiving operations for a receiving station.

Interfaces 506 and 507 are used by the MAC and PHY layer blocks to interact and to exchange information through TXVECTOR (from the MAC to the PHY layer—506) and the RXVECTOR (from the PHY to the MAC block—507). The TXVECTOR and RXVECTOR are defined in the clause 27.2.2 of the draft 4.1 of the 802.11ax standard.

On top of the Figure, application layer block 501 runs an application that generates and receives data packets, for example data packets of a video stream. Application layer block 501 represents all the stack layers above MAC layer according to ISO standardization.

Embodiments of the present invention are now illustrated using various exemplary embodiments.

Although some of the proposed examples use the trigger frames 200 and 220' (see FIG. 2) sent by an AP for a multi-user (MU) uplink (UL) transmissions, equivalent mechanisms can be used in a centralized or in an ad hoc environment (i.e. without an AP). It means that the operations described below with reference to the AP may be performed by any station in an ad hoc environment. In particular, subsequent scheduling to provide scheduled transmission opportunities to the NFRP responding non-AP stations may be provided that is different from the 802.11ax UL MU operation.

Figure 6:
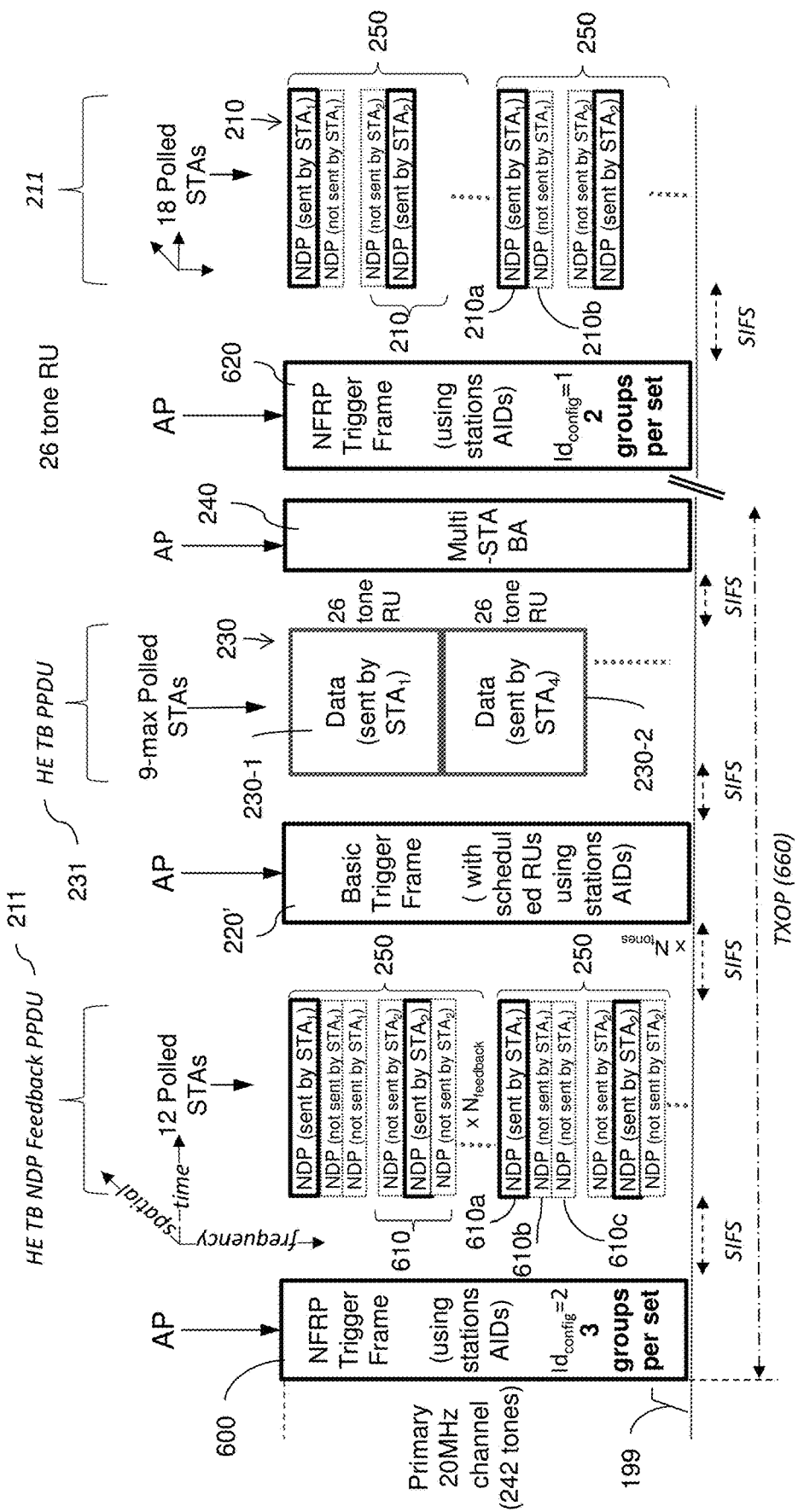
FIG. 6 illustrates embodiments of the invention providing variable number of tone groups (and thus of possible NFRP response values) per RU tone set during the NDP short feedback report procedure.
Figure 6A:
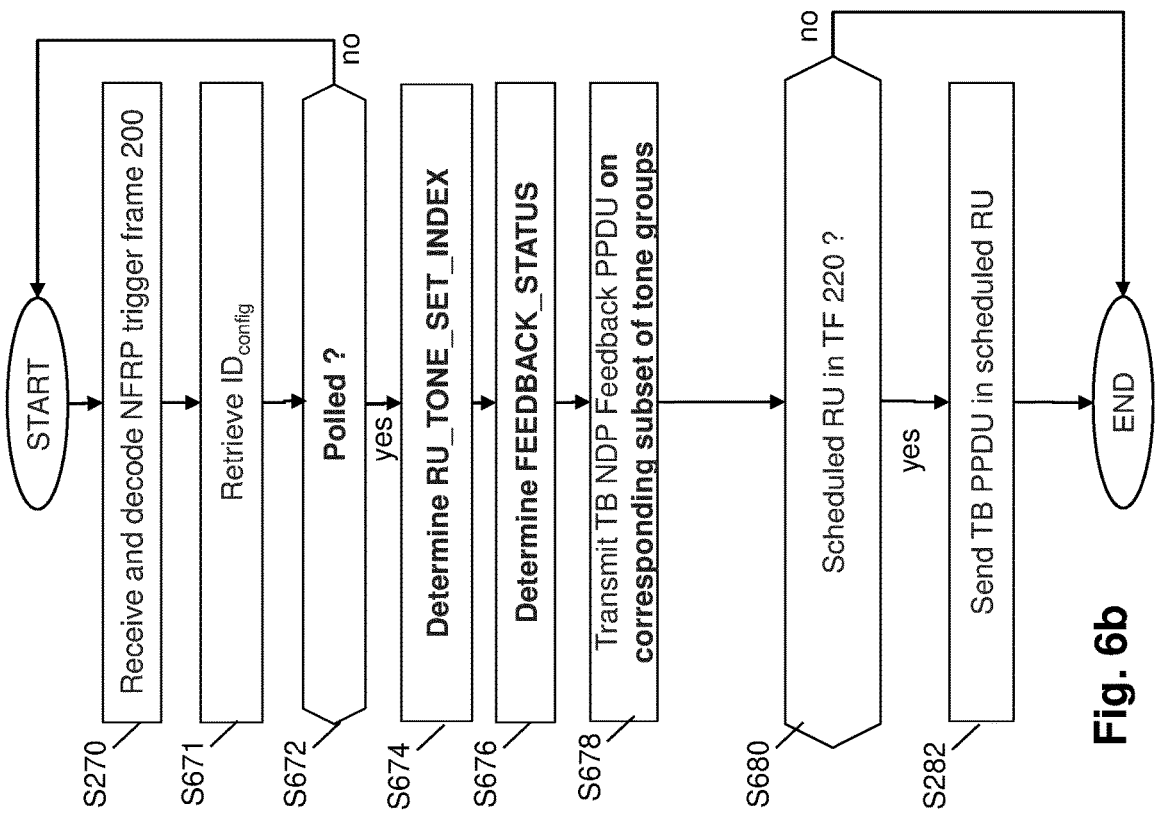
FIGS. 6a and 6b illustrate, using flowcharts, corresponding general steps at the access point and at a non-AP station, respectively.
Figure 6B:
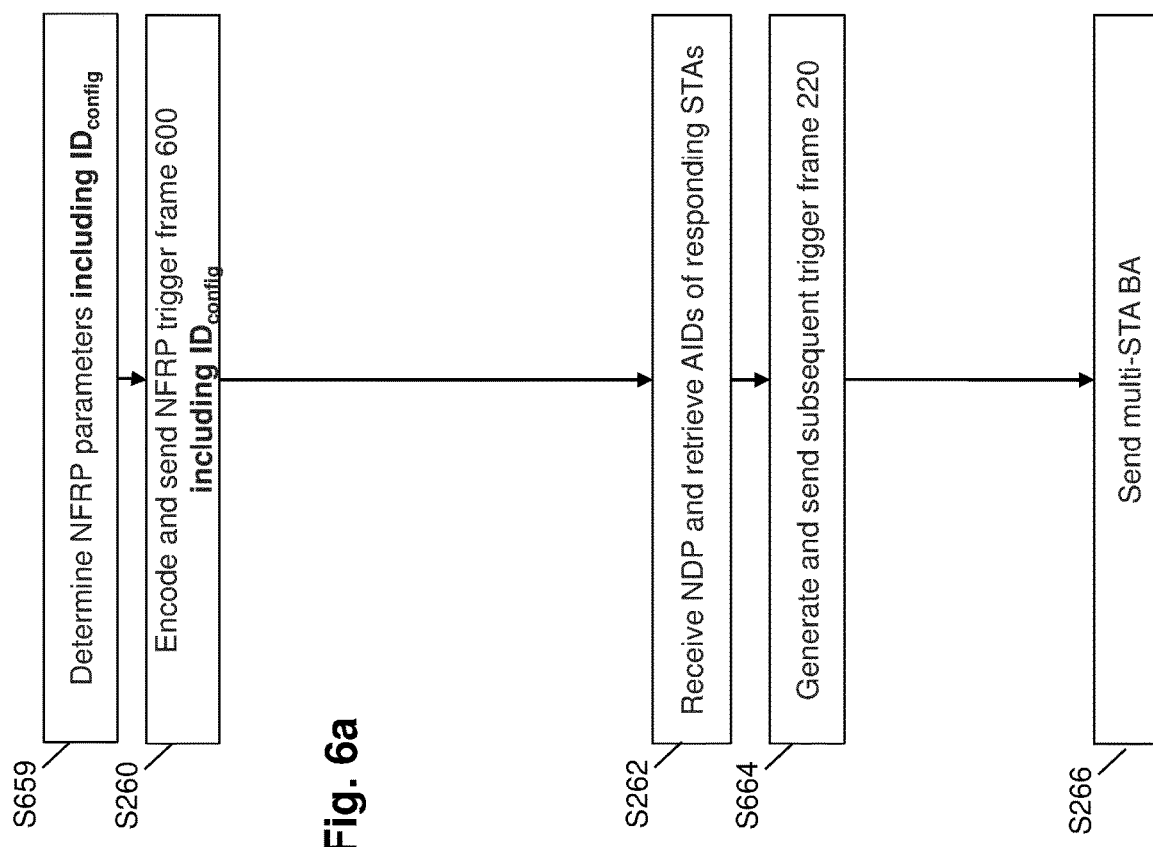

FIG. 6 illustrates embodiments of the invention providing variable number of tone groups (and thus of possible NFRP response values) per RU tone set during NDP short feedback report procedures. FIGS. 6a and 6b illustrate, using flowcharts, corresponding general steps at the AP and a non-AP STA, respectively. The reference numbers are unchanged when referring to the same elements, frames and steps as in FIG. 2.

The AP is willing to poll non-AP stations using a feedback short procedure in order to provide UL MU operation.

At step S659, the AP 110 determines NFRP parameters values for NFRP trigger frame 600 to be sent. According to the invention, this includes determining a RU tone set configuration for the NDP feedback report responses.

Each RU tone set configuration defines a number $N_{feedback}$ of RU tone sets per 20 MHz channel (no MIMO considered at this level), a number $N_{TG}$ of tone groups per RU tone set and a number $N_{tones}$ of tones per tone group. In fact, these three numbers are linked by the following formula $N_{feedback} \times N_{tones} \times N_{TG}$=number of tones per 20 MHz channel (216 in 802.11ax D4.1). Therefore, the knowledge of two of these numbers is enough.

In some embodiments, the number $N_{feedback}$ of RU tone sets 610 per 20 MHz channel is kept unchanged (e.g. 18 sets) through the configurations meaning that each RU tone set 210 has a fixed number of tones, namely 12 tones per RU tone set. In that case, the number $N_{tones}$ of tones per group varies from one configuration to the other when offering different numbers $N_{TG}$ of tone groups 610a, 610b, 610c per RU tone set. In these embodiments, the total number $N_{STA}$ of RU tone sets remains unchanged: $N_{STA}=N_{feedback} \times 2^{BW} \times$ (MultiplexingFlag+1) where $N_{feedback}$ is fixed.

A first illustrative configuration with $N_{TG}=2$ splits the 12 tones of a RU tone set into two tone groups 210a, 210b, thereby having 6 tones per group ($N_{tones}=6$). This is the configuration known from 802.11ax (see FIG. 2).

A second configuration with $N_{TG}=3$ splits the 12 tones of a RU tone set into three tone groups 610a-c, thereby having 4 tones per group ($N_{tones}=4$). This may correspond to the configuration partly shown in the first short feedback procedure of FIG. 6 (provided that they are 18 RU tone sets 610, only two of which are shown).

Other configurations may provide 3 tones per group ($N_{TG}=4$), 2 tones per group ($N_{TG}=6$), 1 tone per group ($N_{TG}=12$) or 12 tones per group ($N_{TG}=1$).

In other embodiments, the number $N_{tones}$ of tones per group is kept unchanged through the configurations meaning that each group of tones 610a-c has a fixed number of tones, e.g. 6 tones per group as proposed in 802.11 ax D4.1. In that case, the number $N_{feedback}$ of RU tone sets 610 varies from one configuration to the other when offering different numbers $N_{TG}$ of tone groups 610a-c per RU tone set. It turns that $N_{STA}=N_{feedback}\times 2^{BW}\times(\text{MultiplexingFlag}+1)$ where $N_{feedback}$ varies.

A first illustrative configuration with $N_{TG}=2$ uses 12 tones per RU tone set 210 and provides 18 RU tone sets for a 20 MHz channel (242 tones but only 216 tones available for RU tone sets). This is the configuration known from 802.11ax (see FIG. 2).

A second configuration with $N_{TG}=3$ uses 18 tones per RU tone set 610 and thus provides 12 RU tone sets for a 20 MHz channel. This may correspond to the configuration partly shown in the first short feedback procedure of FIG. 6 (provided that they are 12 RU tone sets 610, only two of which are shown).

Other configurations may provide 9 RU tone sets per 20 MHz channel ($N_{TG}=4$), 6 RU tone sets per 20 MHz channel ($N_{TG}=6$), 4 RU tone sets per 20 MHz channel ($N_{TG}=9$), 3 RU tone sets per 20 MHz channel ($N_{TG}=12$), 2 RU tone sets per 20 MHz channel ($N_{TG}=18$), or 36 RU tone sets per 20 MHz channel ($N_{TG}=1$).

Of course, other approaches may provide a set of tone set configurations in which both numbers $N_{feedback}$ and $N_{tones}$ vary. In particular, the set of configurations may for instance comprises two or more configurations corresponding to the same number $N_{TG}$ of tone groups per RU tone set, but with different numbers $N_{feedback}$ and $N_{tones}$. The configurations are linked so that $N_{feedback}\times N_{tones}\times N_{TG}=$number of tones per 20 MHz channel (here 216). For illustrative purposes, configurations with $N_{TG}=4$ may be such that $N_{feedback}\times N_{tones}=54$, e.g.:

$N_{feedback}=18$ and $N_{tones}=3$,
$N_{feedback}=9$ and $N_{tones}=6$,
$N_{feedback}=6$ and $N_{tones}=9$, and so on.

The various configurations available to the AP and the non-AP stations are known from them, for instance stored in tables in local memory. Each configuration may be assigned a unique identifier $ID_{config}$. Therefore, each configuration identifier $ID_{config}$ is representative of a number $N_{TG}$ of one or more groups of tones forming each of the RU tone sets.

As mentioned previously, the tone groups 610a-c of the RU tone sets 610 are used to encode the FEEDBACK_STATUS value forming NDP feedback report response, because the non-AP stations send energy (NDP feedback PPDU 211) on the tone groups corresponding to the FEEDBACK_STATUS. In particular, subsets of the groups of tones in an activated state (i.e. on which the non-AP stations will emit energy) correspond to possible response values for the NDP feedback report response, respectively. The number MAX_ENCODED_VALUE of possible FEEDBACK_STATUS values thus depends on the varying number $N_{TG}$ of tone groups per RU tone set, and hence on the configuration identifier $ID_{config}$ chosen by the AP.

It may be decided that each FEEDBACK_STATUS value is associated with only one respective tone group 610a-c, meaning that only one tone group is generally activated at a time (i.e. energy is sent by a station on only one tone group of a responding RU tone set). Therefore, $N_{TG}$ FEEDBACK_STATUS values are possible to respond. In other words, the number MAX_ENCODED_VALUE of possible response values for the NDP feedback report responses is equal to the number of tone group subsets per RU tone set. In that case, the non-AP stations will use a tone group subset to send their NDP feedback report responses, that is made of a single group of tones from the groups of tones forming the RU tone sets.

In a variant, a subset made of two or more groups of tones may correspond to a possible response value, meaning that two or more tone groups are activated at the same time (i.e. energy is sent on a plurality of tone groups of a responding RU tone set). In that case, the number MAX_ENCODED_VALUE of possible response values for the NDP feedback report responses is increased. It is related to $2^n$ where n is the number $N_{TG}$ of tone groups 610a-c per RU tone set 610.

Since any NDP feedback report response requires that energy be sent on at least one tone group 610a-c, the maximum number for MAX_ENCODED_VALUE is $2^n-1$.

In some embodiments, the binary encoding for the FEEDBACK_STATUS may require that there must be at least one "1" (energy on a tone group) and one "0" (no energy on a tone group). This may be to allow the ADC, Analog to Digital Converter, to determine the two values by measuring the min and max power level measured on the tones of a tone set. In that case, the response value using all or none of the tone groups is forbidden, and therefore the maximum number for MAX_ENCODED_VALUE is $2^n-2$. Consequently, the number of possible response values is in the range [0, MAX_ENCODED_VALUE] with MAX_ENCODED_VALUE equal to 1 for $N_{TG}=0$, to 2 for $N_{TG}=1$, to 6 to $N_{TG}=3$, to 14 for $N_{TG}=4$, and so on.

Given the tone set configurations available, the AP has to decide on the granularity of the NDP feedback report responses, i.e. on the MAX_ENCODED_VALUE value it wishes and thus on $N_{TG}$.

Furthermore, the AP can decide on the number $N_{STA}$ of RU tone sets it wishes to offer to the non-AP stations: $N_{STA}=N_{feedback}\times 2^{BW}\times(\text{MultiplexingFlag}+1)$. Where $N_{feedback}$ is fixed, the AP can only adjust BW and Multiplexing flag values. Otherwise, it also determines $N_{feedback}$.

Such decisions performed at step S659 makes it possible for the AP to determine the most appropriate tone set configuration to be used. By default, $N_{TG}$ may be set to 2 in order to select the tone set configuration corresponding to Table 27-30 of 802.11ax D4.1. This value may evolve over time as the AP evaluates network behavior (including number of non-AP stations, etc.).

For instance, the AP may select a tone set configuration representative of a high number $N_{TG}$ of groups of tones depending on the number of new non-AP stations having recently (e.g. since the last short feedback procedure) registered to the AP. Indeed, the AP already knows little or more about already registered non-AP stations but needs to know about new non-AP stations' needs to correctly serve then.

Consequently, when the number of new non-AP stations is reduced, less RU tone sets may be offered with a higher number $N_{TG}$ of tone groups per RU tone set, hence the AP can request a more precise evaluation of the buffered data ready for transmission in the queues of the polled non-AP stations.

On the other hand, when the number of new non-AP stations is high, the AP may wish to obtain coarse or rough evaluation of the buffered data amount for a high number of these stations. In other words, more RU tone sets may be offered with a lower number $N_{TG}$ of tone groups per RU tone set.

Consequently, the AP may determine a number of stations having newly registered to the AP, e.g. since a previous NFRP trigger frame or previous NFRP procedure, and then determine the tone set configuration based on the determined number of newly registered stations (for the next NFRP procedure).

At this stage, the AP knows the tone set configuration it wishes to use for the RU tone sets of the forthcoming short feedback procedure. The tone set configuration is uniquely identified by its $ID_{config}$.

$N_{feedback}$, $N_{tones}$ and $N_{TG}$ are known.

The AP also determines the other NFRP parameters such as:

BW 330 and Multiplexing Flag 356, depending on the number of non-AP stations the AP wishes to poll (or number of RU tone sets the AP wished to offer to the non-AP stations), Feedback type 353, depending on the question the AP wishes to ask to the polled non-AP stations, and StartingAID 351, depending on which range of AIDs the AP wishes to poll. In a variant to scheduled AIDs where StartingAID defines the first AID of the polling range, the NFRP trigger frame may offer random RU tone sets that the non-AP stations can access using contention. A signaling of such random-based RU tone sets may be provided by setting StartingAID to a predefined value known by all stations, e.g. to 0 to target all the non-AP stations yet associated with the AP, or to a Basic Service Set Identifier, BSSID, index of a BSS to poll all the non-AP stations belonging to this BSS, or to any other value that targets a specific group of non-AP stations.

In the example of FIG. 6, the AP has thus decided to use a tone set configuration with three tone groups 610a-c per RU tone set 610 ($N_{TG}$=3).

Next, at step S660, the AP builds the NFRP trigger frame 600 and sends it to poll non-AP STAs to know their needs for transmission.

The tone set configuration selected at step S659 is specified in the NFRP trigger frame 600.

Various way to signal it may be envisioned.

In some embodiments, $ID_{config}$ is encoded using a x-bit field (referred below to as "RU configuration field"), where integer x is such as $2^x$ is the ceiling of the number of tone set configurations available less 1, e.g. the number of possible values for $N_{TG}$ less 1 when the set of tone set configurations comprises only one tone set configuration per $N_{TG}$ value.

For easy of illustration, $ID_{config}$ may be set to $N_{TG}-1$ when $N_{TG}$ can take the values 1, 2, 3 and 4 thereby requiring a 2-bit field:

| $ID_{config}$ in RU configuration field | $N_{TG}$ - number of tone groups per RU tone set |
|---|---|
| 0 (binary 00) | 1 |
| 1 (binary 01) | 2 |
| 2 (binary 10) | 3 |
| 3 (binary 11) | 4 |

Figure 7:
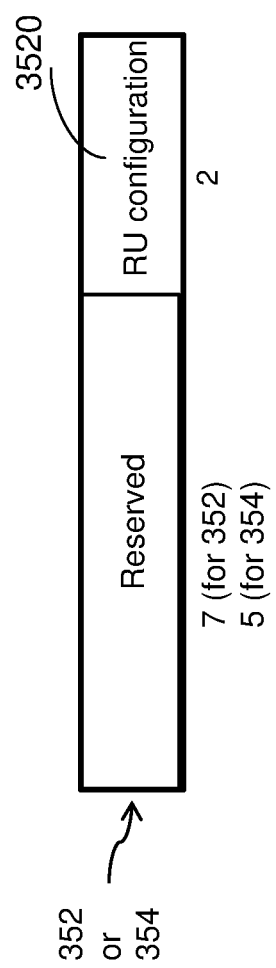
FIG. 7 illustrates an exemplary signaling of a tone set configuration in a NFRP trigger frame according to embodiments of the invention.

In one embodiment, the x-bit RU configuration field 3520 is included in Reserved field 352 or 354 as illustrated in FIG. 7 for instance.

In a variant, the x-bit RU configuration field is included in Trigger Dependent Common Info field 340.

In other embodiments, the Feedback Type (field 353) may indicate simultaneously both the question to be answered by the non-AP stations during the short feedback procedure and the tone set configuration to be used for the RU tone sets. The Feedback Type thus acts as an $ID_{config}$ indication.

802.11ax D4.1 currently defines Feedback Type=0 for resource request using two tone groups 210a, 210b per RU tone set 210. Other values of the Feedback Type may be used still for resource request but using a different number $N_{TG}$ of tone groups per RU tone set. This advantageously keeps retrocompatibility with the current version of 802.11ax. For instance,

| Feedback Type 353 ($ID_{config}$) | $N_{TG}$ - number of tone groups per RU tone set |
|---|---|
| 0 | 2 (conventional scheme) |
| 1 | 1 |
| 2 | 3 |
| 3 | 4 |

Of course, other allocations of Feedback Types with $N_{TG}$ values may be contemplated. More generally, any correspondence between the Feedback Types and the $ID_{config}$ may be provided (to allow various tone set configurations having the same $N_{TG}$).

At step S270, any non-AP station 101-107 receives the NFRP Trigger frame 600 and decodes it. If the receiving non-AP station belongs to a BSS (or virtual BSS) of the transmitting AP, the Trigger Frame is not filtered by the PHY layer as defined in the standard. The filtering is made on so-called "colors" defined in the 802.11ax standard, which mandates that the BSS colors of all the multiple BSSs managed by a single AP are the same.

At step S671, the non-AP STA retrieves the tone set configuration indication from the NFRP trigger frame 600, for instance the configuration identifier $ID_{config}$ from RU Configuration field (e.g. 3520).

At step S672, the non-AP STA determines whether it is polled (i.e. targeted) by the NFRP trigger frame 600.

In case the NFRP trigger frame 600 provides random RU tone sets (StartingAID 351 set to 0 or BSSID index or any suitable value), the non-AP station can determine whether it belongs to the targeted group of AIDs, and in the affirmative, then determine by its own whether it has interest in contending for access to the random RU tone sets. In the affirmative, the test S672 is positive.

In case the NFRP trigger frame 600 defines a polling range [StartingAID, StartingAID+$N_{STA}$], the determination is based on the retrieved tone set configuration and the conventional NFRP parameters, because various tone set configurations are available and target a varying number of non-AP stations.

The non-AP station thus obtains $N_{feedback}$ from the retrieved tone set configuration (the parameters of which being stored in a local table) and then calculates $N_{STA}=N_{feedback} \times 2^{BW} \times (MultiplexingFlag+1)$.

When the number $N_{tones}$ of tones per tone group is fixed (e.g. 6 as in 802.11ax D4.1), this formula becomes $N_{STA}=(36/N_{TG}) \times 2^{BW} \times (MultiplexingFlag+1)=(36/(ID_{config}+1)) \times 2^{BW} \times (MultiplexingFlag+1)$.

In the example of FIG. 6, $N_{TG}=3$. Consequently, $N_{STA}=12$ (for a 20 MHz channel without MIMO). The polling range is thus [StartingAID, StartingAID+12].

The non-AP stations thus checks whether its AID is included in the polling range. If the STA's AID is higher (or equal) to Starting AID 351 and lower than the sum of Starting AID 351 and $N_{STA}$ value so determined, then the non-AP station is addressed by the current NFRP trigger frame.

At step S674, the non-AP STA determines the index RU_TONE_SET_INDEX of the RU tone set 610 to be used to transmit energy in response to the NFRP trigger frame.

In case of random RU tone sets, the selection of the RU tone set is made on a random basis, by randomly selecting an index from among the available indexes. All the RU tone sets are available for contention. Optionally, only the RU tone sets that fit into station capabilities are eligible for contention (e.g. a station operating on a limited band BW such as a 20 MHz-only station). The non-AP STA therefore randomly selects a RU tone set Index to send its short feedback: RU_TONE_SET_INDEX=random [0, $N_{STA}$−1]. Here, it is chosen to start the indexes at 0. In variant, the first index may have another value, e.g. 1 or above, and the provided formulae are modified accordingly.

In case of scheduled RU tone sets, the scheduled non-AP STA usually selects a responding RU tone set based on the position of its AID within the above polling range, meaning the first RU tone set for the non-AP station having the Starting AID as own AID, the second RU tone set for the non-AP station having the next AID in the polling range, and so on. In other words, the non-AP stations selects RU_TONE_SET_INDEX corresponding to its AID minus StartingAID.

Next at step S676, the non-AP station determining a response value (i.e. FEEDBACK_STATUS value) for NDP feedback report response to the NFRP trigger frame 600, based on the tone set configuration retrieved at step S671. It is also based on the station's internal status (e.g. an amount of buffered data). Indeed, for instance, the same amount of buffered bytes may correspond to different FEEDBACK_STATUS values depending on the response granularity (i.e. $N_{TG}$) imposed by the AP.

As mentioned above, $N_{TG}$ values may be available for the FEEDBACK_STATUS when each response value corresponds to only one and the same tone group. In a variant, $2^{\wedge}N_{TG}-1$ or $2^{\wedge}N_{TG}-2$ values may be available when the tone groups may be combined. This maximum value is referred to as MAX_ENCODED_VALUE.

The possible response values for FEEDBACK_STATUS may be associated with respective ranges for a station measurement corresponding to the Feedback Type (e.g. amount of buffered data). Therefore, FEEDBACK_STATUS=0 corresponds to a first measurement range, FEEDBACK_STATUS=1 corresponds to a next measurement range, and so on. Each range may be defined by a different multiplying factor applied to the same threshold value TH. For instance the first measurement range may be [0; TH[, the second measurement range [TH; 2.TH[, and so on (the last measurement range being from MAX_ENCODED_VALUE.TH).

When applied to the buffered bytes, the possible FEEDBACK_STATUS response can be based on a multiple of the queue size threshold as defined in FIG. 2. In this case, FEEDBACK_STATUS is set to the maximum value n satisfying Q (amount of buffered data)≥n×TH, with n in [0, MAX_ENCODED_VALUE]. This embodiment is compatible with current 802.11ax D4.1 approach where only 2 responses are possible: 1 if Q>1×TH, 0 otherwise (Q>0×TH).

In other embodiments, the FEEDBACK_STATUS values may be used to report the amount of buffered data per each EDCA access category, AC. For instance, a tone set configuration with four tone groups per RU tone set makes it possible to give feedback for each of the four EDCA ACs.

A Feedback Type (field 353) different from 0 may be used to request such feedbacks per AC. The AP can thus switch between requesting report of the overall amount of buffered data with respect to a threshold value (conventional scheme with $N_{TG}=2$) and requesting report of the presence of buffered data per each AC with respect to the threshold value.

Preferably, $N_{TG}=4$, in which case a tone group is assigned to a first AC (e.g. AC_VO), a second group to a second AC (AC_VI), a third group to a third AC (AC_BE) and a fourth group to a fourth AC (AC_BK). If the amount of buffered data for a given AC is above the threshold, the non-AP station selects the corresponding tone group. All the selected tone groups form a subset of tone groups to be activated (by sending energy). The FEEDBACK_STATUS is chosen to correspond to the subset (i.e. to send energy on all the selected tone groups). Indeed, all the selected tone groups will be activated, and the AP, detecting energy on them, will directly know which ACs have buffered bytes above the threshold.

Once the response value for the FEEDBACK_STATUS is known, the non-AP station sends the NDP feedback report response over the selected responding RU tone set (i.e. with RU_TONE_SET_INDEX) at step S678. The sending consists in activating the appropriate tone groups 610*a-c*, i.e. sending energy (HE TB NDP Feedback PPDU 211) on them.

Based on the retrieved tone set configuration, the non-AP station determines the tone indices forming the tone groups for the FEEDBACK_STATUS. This may be done by retrieving the tone mapping for the HE TB feedback NDP, given the tone set configuration used. Table 27-30 of 802.11ax D4.1 gives an example of such tone mapping that is applicable for $N_{TG}=2$. Similar mappings may be stored locally for all the possible tone set configurations (mappings known by all the stations, including the AP).

The table below provides an illustrative excerpt of two tone mappings for some RU_TONE_SET_INDEX (1 to 4) and for two tone set configurations corresponding to $N_{TG}=2$ and $N_{TG}=3$, when $N_{tones}=6$:

| | $N_{TG} = 2$ (802.11 ax D4.1) | | $N_{TG} = 3$ | | |
|---|---|---|---|---|---|
| RU_TONE_SET_INDEX | 1st tone group (210a) | 2nd tone group (210b) | 1st tone group (610a) | 2nd tone group (610b) | 3rd tone group (610c) |
| 1 | −113, −77, −41, 6, 42, 78 | −112, −76, −40, 7, 43, 79 | −113, −77, −41, 6, 42, 78 | −112, −76, −40, 7, 43, 79 | −111, −75, −39, 8, 44, 80 |
| 2 | −111, −75, −39, 8, 44, 80 | −110, −74, −38, 9, 45, 81 | −110, −74, −38, 9, 45, 81 | −109, −73, −37, 10, 46, 82 | −108, −72, −36, 11, 47, 83 |
| 3 | −109, −73, −37, 10, 46, 82 | −108, −72, −36, 11, 47, 83 | −107, −71, −35, 12, 48, 84 | −106, −70, −34, 13, 49, 85 | −105, −69, −33, 14, 50, 86 |
| 4 | −107, −71, −35, 12, 48, 84 | −106, −70, −34, 13, 49, 85 and so on. | −104, −68, −32, 15, 51, 87 | −103, −67, −31, 16, 52, 88 | −102, −66, −30, 17, 53, 89 |

In this example, each RU tone set is thus made of adjacent groups of tones (−113 is adjacent to −112, itself adjacent to −111 [for $N_{TG}$=3], −77 to −76 which is adjacent to −75, and so on.), each group being made of non-adjacent tones (−113 not adjacent to −77 and so on.).

Once the tone indices for FEEDBACK_STATUS are known, the non-AP station sends the HE TB NDP Feedback PPDU 211 on them.

The non-AP STA transmits the header 212 of TB Feedback PPDU 211 on the 20 MHz channel corresponding to the selected RU_TONE_SET_INDEX, and transmits on each of the subcarrier indexes determined for the FEEDBACK_STATUS value, the value of the HE-LTF sequence 213.

In the example of FIG. 6, Station 1 transmits energy (NDP) on tone group 610a of its responding RU tone set (index=1) for instance to indicate it has an amount of buffered bytes between 0 and TH, while Station 2 transmits energy (NDP) on tone group 610b of its responding RU tone set (index=2) for instance to indicate it has an amount of buffered bytes between TH and 2.TH. The third tone group 610c could be used by any non-AP station to report an amount of buffered data above 2.TH.

As explained above, the value of FEEDBACK_STATUS can also lead a non-AP stations to transmit energy (NDP) on several tone group 610a-c at the same time. For instance, with $N_{TG}$=4 a non-AP station may transmit energy (NDP) on the first and third tone groups from amongst the four tone groups available, to indicate it has buffered bytes for AC_VO and AC_BE.

The AP receives and decodes (S262) the RU tone sets where energy is present, to provide to its MAC layer a list of used RU_TONE_SET_INDEX and the corresponding Feedback responses (FEEDBACK_STATUS values). At this stage, the AP knows the transmission needs of the polled stations.

In case random RU tone sets were provided, it is not possible for the AP to know exactly which non-AP stations has responded on which RU tone set.

At step S664, the AP can send a subsequent trigger frame 220' to offer new opportunities (RUs) to the responding non-AP STAs, for example a 'Basic' type trigger frame or any convenient type. Preferably, the scheduled RUs are of narrow width (26 tones) to offer a maximum of nine RUs per 20 MHz channel. The AP may select a subset of the responding non-AP STAs, preferably based on the NFRP responses received. For instance, the AP may offer RUs to those responding non-AP stations having a large amount of buffered bytes or having buffered bytes in priority ACs.

The AP thus retrieves the AIDs of the selected responding non-AP stations, usually StartingAID+RU_TONE_SET_INDEX for those non-AP stations having been scheduled in the short feedback procedure. For those non-AP stations having selected a responding RU tone set on a random basis, the AP may use an AID based on the RU_TONE_SET_INDEX, for instance RU_TONE_SET_INDEX+Offset_AID, where Offset_AID is 2048 or higher to avoid any conflict with the AIDs conventionally assigned to the non-AP stations by the AP.

At step S664, the AP 110 thus sends the subsequent basic trigger frame 220' so built.

Any non-AP STA receiving the subsequent trigger frame 220' thus determines (step S680) whether it is scheduled, i.e. whether a resource unit is assigned its own AID or to RU_TONE_SET_INDEX (selected at step S674)+Offset_AID in case of random-based NFRP procedure.

In case of positive determination at step S680, the non-AP STA can use the RU scheduled to it and transmit data 231 (HE TB PPDU) to the AP. This is step S282. The HE TB PPDU 231 contains the MAC address of the sending non-AP station, making it possible for the AP to identify each sending non-AP station involved in a RU assigned to RU_TONE_SET_INDEX+Offset_AID.

As shown in FIG. 6,
Station 1 has responded to the NFRP trigger frame 600 and has been selected by the AP for the MU UL operation. It is then allocated a scheduled RU 230-1 for transmission of its data;
Station 4 has also responded to the NFRP trigger frame 600 and has been selected by the AP for the MU UL operation. It is then allocated a scheduled RU 230-2 on which it transmits data.

The AP 110 thus receives the HE TB PPDU 231 over the multiple scheduled RUs. It can then acknowledge (or not) the data on each RU by sending a multi-STA block acknowledgment (BA) response 240, making it possible for each sending non-AP STA to know when its data transmission is successful (reception of the ACK) or not (no ACK after expiry of a time-out). This is step S266.

The process may then loop back to S659 for the AP in order to send a new NFRP trigger frame 620 with another tone set configuration ($N_{TG}$=2 in the example). The new NFRP trigger frame includes a tone set configuration indication representative of a number $N_{TG}$=2 of tone groups per RU tone set that is different from the number $N_{TG}$=3 of tone groups used by the first NFRP trigger frame 600. Consequently, the AP 110 can dynamically adapt the configuration of the RU tone sets to network conditions for instance.

Although the present invention has been described herein above with reference to specific embodiments, the present invention is not limited to the specific embodiments, and modifications will be apparent to a skilled person in the art which lie within the scope of the present invention.

Many further modifications and variations will suggest themselves to those versed in the art upon referring to the foregoing illustrative embodiments, which are given by way of example only and which are not intended to limit the scope of the invention, that being determined solely by the appended claims. In particular, the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A communication method in a wireless network, comprising the following steps at a station:
receiving, from an access point (AP) a null data packet (NDP) feedback report poll (NFRP) trigger frame, the NFRP trigger frame reserving a plurality of resource unit (RU) tone sets for NDP feedback report responses by stations,
retrieving, from the NFRP trigger frame, a tone set configuration indication representative of a number of one or more groups of tones forming each of the RU tone sets, wherein one or more subsets of the groups of tones in an activated state correspond to one or more possible response values for the NDP feedback report responses, respectively, and wherein possible values for the tone set configuration indication include a value indicating more than two tone groups per tone set,
determining a response value for a NDP feedback report response by the station to the NFRP trigger frame based on the tone set configuration indication, and
sending the NDP feedback report response by activating the tone groups of the subset corresponding to the determined response value, in a selected responding RU tone set.

2. The method of claim 1, further comprising, at the station, determining tones forming the subset of tone groups to be activated, based on the retrieved tone set configuration indication.

3. The method of claim 1, further comprising, at the station, determining whether the station is polled by the NFRP trigger frame based on the retrieved tone set configuration indication.

4. The method of claim 1, wherein determining the response value for a NDP feedback report response includes determining a response value from a set of possible response values the number of which depends on the tone set configuration indication.

5. The method of claim 1, further comprising, at the station, receiving, from the AP, a second NFRP trigger frame reserving a plurality of second RU tone sets for NDP feedback report responses by stations, wherein the second NFRP trigger frame includes a tone set configuration indication representative of a number of one or more groups of tones forming each of the second RU tone sets that is different from the number of tone groups forming each of the RU tone set of the other NFRP trigger frame.

6. The method of claim 1, wherein each tone group of the groups of tones forming the responding RU tone set is associated with a respective traffic access category, AC, from a group of traffic ACs, and determining a response value for the NDP feedback report response comprises:

for each traffic AC, selecting or not the tone group associated with the traffic AC based on an AC-based criterion, and
selecting the response value corresponding to the subset formed of the selected tone groups.

7. The method of claim 1, wherein each tone group subset of a RU tone set is made of a single group of tones from the groups of tones forming the RU tone sets.

8. The method of claim 1, wherein the number of possible response values for the NDP feedback report responses is equal to the number of tone groups per RU tone set, or wherein the number of possible response values for the NDP feedback report responses is related to $2^n$ where n is the number of tone groups per RU tone set.

9. The method of claim 1, wherein at least one tone group subset of a RU tone set is made of two or more groups of tones from the groups of tones forming the RU tone sets.

10. The method of claim 1, wherein the possible response values for the NDP feedback report response are associated with respective ranges for a station measurement, each range being defined by a different multiplying factor applied to the same threshold value.

11. The method of claim 1, wherein the tone set configuration indication is included in a Reserved field of a User Info field of the NFRP trigger frame according to Draft 4.1 of IEEE 802.11ax, wherein the tone set configuration indication is included in a Trigger Dependent Common Info field of a Common Info field of the NFRP trigger frame according to Draft 4.1 of IEEE 802.11ax, wherein the tone set configuration indication is defined by a feedback type field in the NFRP trigger frame, or wherein the tone set configuration indication is a 2-bit field in the NFRP trigger frame and the number of one or more groups of tones forming each of the RU tone sets is equal to the tone set configuration indication plus 1.

12. The method of claim 1, wherein each RU tone set has a fixed number of tones and the tone set configuration indication adjusts the number of tones per group.

13. The method of claim 1, wherein each group of tones has a fixed number of tones and the tone set configuration indication adjusts the number of RU tone sets.

14. A non-transitory computer-readable medium storing a program which, when executed by a microprocessor or computer system in a communication device, causes the communication device to perform the communication method of claim 1.

15. A communication device comprising at least one microprocessor configured for carrying out the steps of the communication method of claim 1.

16. A communication method in a wireless network, comprising the following steps at an access point:
sending, to stations, a null data packet (NDP) feedback report poll (NFRP) trigger frame, the NFRP trigger frame reserving a plurality of resource unit (RU)tone sets for NDP feedback report responses by stations, wherein the NFRP trigger frame includes a tone set configuration indication representative of a number of one or more groups of tones forming each of the RU tone sets, wherein one or more subsets of the groups of tones in an activated state correspond to one or more possible response values for the NDP feedback report responses, respectively, and wherein possible values for the tone set configuration indication include a value indicating more than two tone groups per tone set, receiving at least one NDP feedback report response through activation by at least one responding station of the tone groups of one of the subsets in a responding RU tone set, and determining a response value for the NDP feedback report response based on the subset corresponding to the activated tone groups in the responding RU tone set.

17. The method of claim 16, further comprising, at the AP, determining a number of stations having newly registered to the AP, and determining the tone set configuration indication based on the determined number of newly registered stations.

18. The method of claim 16, wherein the AP provides a tone set configuration indication representative of a high number of groups of tones when a low number of newly registered stations is determined, or provides a tone set configuration indication representative of a low number of groups of tones when a high number of newly registered stations is determined.

19. The method of claim 16, further comprising, at the AP:

receiving NDP feedback report responses from responding stations and determining corresponding response values, selecting a subset of the responding stations based on the corresponding response values so determined, and sending, to the stations, a subsequent trigger frame reserving a plurality of resource units scheduled for stations of the selected subset.

20. The method of claim 16, further comprising, at the AP, sending, to the stations, a second NFRP trigger frame reserving a plurality of second RU tone sets for NDP feedback report responses by stations, wherein the second NFRP trigger frame includes a tone set configuration indication representative of a number of one or more groups of tones forming each of the second RU tone sets that is different from the number of tone groups forming each of the RU tone set of the other NFRP trigger frame.

21. A non-transitory computer-readable medium storing a program which, when executed by a microprocessor or computer system in a communication device, causes the communication device to perform the communication method of claim 16.

22. A communication device comprising at least one microprocessor configured for carrying out the steps of the communication method of claim 16.

* * * * *